US006795378B2

(12) United States Patent
Shimizu et al.

(10) Patent No.: US 6,795,378 B2
(45) Date of Patent: Sep. 21, 2004

(54) ELECTRONIC DEVICE, ELECTRONICALLY CONTROLLED MECHANICAL TIMEPIECE, AND CONTROL METHOD THEREFOR

(75) Inventors: Eisaku Shimizu, Suwa (JP); Kunio Koike, Suwa (JP); Hidenori Nakamura, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 395 days.

(21) Appl. No.: 09/771,486

(22) Filed: Jan. 25, 2001

(65) Prior Publication Data

US 2001/0030909 A1 Oct. 18, 2001

Related U.S. Application Data

(63) Continuation-in-part of application No. 09/162,876, filed on Sep. 29, 1998, now Pat. No. 6,373,789, and a continuation-in-part of application No. 09/518,812, filed on Mar. 3, 2000, now Pat. No. 6,483,276.

(30) Foreign Application Priority Data

| | | |
|---|---|---|
| Sep. 30, 1997 | (JP) | 09-265205 |
| Apr. 17, 1998 | (JP) | 10-108251 |
| Aug. 4, 1998 | (JP) | 10-220738 |
| Mar. 3, 1999 | (JP) | 11-055545 |
| Mar. 29, 1999 | (JP) | 11-086949 |
| Dec. 2, 1999 | (JP) | 11-343262 |
| Dec. 22, 1999 | (JP) | 11-364956 |

(51) Int. Cl.$^{7}$ .......................... G04B 1/00; G04C 3/00; H02D 9/04

(52) U.S. Cl. .......................... 368/204; 322/8; 322/24; 322/29

(58) Field of Search .................. 368/64, 66, 203–205; 322/8, 29, 46, 24; 318/696

(56) References Cited

U.S. PATENT DOCUMENTS

| | | | | |
|---|---|---|---|---|
| 3,937,001 A | | 2/1976 | Berney | |
| 4,361,409 A | | 11/1982 | Sutter | |
| 4,799,003 A | | 1/1989 | Tu et al. | |
| 5,517,469 A | | 5/1996 | Wiget | |
| 5,668,414 A | | 9/1997 | Takahashi et al. | |
| 5,699,322 A | | 12/1997 | Born | |
| 5,740,131 A | | 4/1998 | Bernasconi | |
| 5,751,666 A | | 5/1998 | Farine et al. | |
| 5,881,027 A | | 3/1999 | Schafroth | |
| 6,041,021 A | * | 3/2000 | Shinkawa | 368/64 |
| 6,252,828 B1 | * | 6/2001 | Shinkawa et al. | 368/203 |
| 6,373,789 B2 | * | 4/2002 | Koike et al. | 368/204 |

FOREIGN PATENT DOCUMENTS

| | | |
|---|---|---|
| EP | 0 239 820 | 10/1987 |
| EP | 0 762 243 | 3/1997 |
| EP | 0 816 955 | 1/1998 |
| JP | 7-119812 | 5/1995 |
| JP | 8-101284 | 4/1996 |
| JP | 2780356 | 5/1998 |

* cited by examiner

*Primary Examiner*—Vit W. Miska
(74) *Attorney, Agent, or Firm*—Mark P. Watson

(57) ABSTRACT

An electronically controlled mechanical timepiece, which is an electronic device, is equipped with a generator 2 for converting the mechanical energy transmitted from a mainspring through the intermediary of a wheel train into electrical energy, and a rotation control unit for controlling the rotation cycle of the generator 2. The rotation control unit is equipped with a count-up/down counter 60 that compares a reference signal with a rotation detection signal of the generator 2 thereby to adjust a braking time for the generator 2, and a brake control signal generating circuit 81 that corrects the time set at the count-up/down counter 60 on the basis of the rotation cycle of the generator 2. If the rotation cycle of the generator 2 significantly deviates from a reference signal cycle, then the braking time is adjusted on the basis of the rotation cycle. Therefore, optimum brake control can be conducted, a secure and sufficient brake amount can be provided, and the responsiveness in speed control can be enhanced.

22 Claims, 15 Drawing Sheets

ELECTRONIC DEVICE, ELECTRONICALLY CONTROLLED MECHANICAL TIMEPIECE, AND CONTROL METHOD THEREFOR

CROSS REFERENCE TO RELATED APPLICATIONS

This application is a continuation-in-part of U.S. application Ser. No. 09/162,876 filed Sep. 29, 1998 now U.S. Pat. No. 6,373,789, and U.S. application Ser. No. 09/518,812 filed Mar. 3, 2000, now U.S. Pat. No. 6,483,276.

TECHNICAL FIELD

The present invention relates to an electronic device, an electronically controlled mechanical timepiece, and a control method therefore, and more particularly, to an electronic device having a mechanical energy source, a generator that is driven by the mechanical energy source, generates induced electric power, and outputs electrical energy, an electric storage unit for storing the electrical energy output from the generator, and a rotation control unit that is driven by the electrical energy supplied from the electric storing unit and controls the rotation cycle of the generator; an electronically controlled mechanical timepiece; and a control method therefor.

BACKGROUND ART

As an electronically controlled mechanical timepiece that converts the mechanical energy produced when a mainspring is unwound into electrical energy by a generator, uses the electrical energy to actuate a rotation control unit so as to control the value of a current passing through a coil of the generator, thereby accurately driving the hands fixed to a wheel train to accurately display time, there has been known an electronically controlled mechanical timepiece disclosed in Japanese Examined Patent Application Publication No. 7-119812.

In the invention disclosed in the Japanese Examined Patent Application Publication No. 7-119812, brake-OFF control is conducted at each of a plurality of first time points that periodically take place at the cycle of a reference signal from a crystal oscillator or the like, and brake-ON control is conducted at a second time point spaced away the first time point in the cycle of the reference signal. The brake-ON control and the brake-OFF control are always carried out in one cycle of a reference cycle.

However, the brake-ON control begun at the second time point of a reference cycle is forcibly switched to the brake-OFF control at the first time point of the next reference cycle regardless of the rotation state of the generator. This has been posing a problem in that a sufficient brake amount cannot be supplied, depending on the state, and much time is required before speed control is completed.

Furthermore, in addition to the electronically controlled mechanical timepieces, in a variety of electronic devices, such as music boxes, metronomes, toys, and electric razors, that have components rotatively controlled by mechanical energy sources, such as springs or elastic, there has always been a demand for improved accuracy of moving parts, e.g., the operations of the drums of music boxes or the pendulums of metronomes, by conducting accurate brake control.

An object of the present invention is to provide an electronic device capable of applying an accurate and sufficient brake amount and of achieving improved responsiveness of speed control and stable control, an electronically controlled mechanical timepiece, and a control method therefor.

DISCLOSURE OF INVENTION

An electronic device of the present invention is equipped with a mechanical energy source, a generator that is driven by the mechanical energy source, generates induced electric power, and supplies electrical energy, and a rotation control unit that is driven by the electrical energy and controls a rotation cycle of the generator, wherein the rotation control unit is provided with a brake control unit that compares a reference signal issued based on a signal from a time standard source with a rotation detection signal based on the rotation cycle of the generator thereby to adjust a braking time of the generator, and a brake amount correcting unit for correcting the braking time set by the brake control unit on the basis of the rotation cycle of the generator.

At this time, preferably, the brake amount correcting unit corrects the braking time by making the braking time shorter than the time set by the brake control unit if the rotation cycle of the generator is later (or longer: the same will apply hereinafter) than a predetermined range based on the cycle of the reference signal.

The brake amount correcting unit may correct the braking time by making the braking time longer than the time set by the brake control unit if the rotation cycle of the generator is earlier (or shorter: the same will apply hereinafter) than the predetermined range.

Preferably, the brake amount correcting unit corrects the braking time by making the braking time shorter than the time set by the brake control unit if the rotation cycle of the generator is later than a predetermined range based on the cycle of the reference signal, or by making the braking time longer than the time set by the brake control unit if the rotation cycle of the generator is earlier than the predetermined range.

In the electronic device in accordance with the present invention, the generator is driven by a mechanical energy source, such as a spring, and the number of rotations of a rotor is controlled by applying a brake to the generator by a rotation control unit.

At this time, if the rotation cycle of the generator is close to the reference signal cycle, that is, if the rotation cycle is based on the reference signal cycle and stays within a predetermined range, then the brake control is carried out on the basis of the braking time set by the comparison between the reference signal and a rotation detection signal performed by the brake control unit.

Furthermore, if the rotation cycle of the generator significantly deviates from the reference signal cycle, then the braking time, i.e., the brake amount, is adjusted on the basis of the rotation cycle. For example, if the rotation cycle is shorter than the reference signal cycle, then the braking time is made longer than the time set at the brake control unit so as to suppress the rotational speed of the generator thereby causing the rotation cycle to quickly approach the reference signal. If the rotation cycle is longer than the reference signal cycle, then the rotational speed of the generator is increased by making the braking time shorter than the time set at the brake control unit so as to increase the rotational speed of the generator, thereby causing the rotation cycle to quickly approach the reference signal.

With this arrangement, optimum brake control is conducted on the basis of the rotation cycle of the generator regardless of the reference cycle; hence, a secure, sufficient brake amount is applied, and the responsiveness in speed control can be enhanced, as compared with the case where the brake-ON control and the brake-OFF control are always carried out in every cycle of the reference cycle. Thus, variations in the rotation cycle of a rotor of a generator can be reduced, allowing the generator to stably rotate at a substantially constant speed.

The time during which the brake amount correcting unit adjusts the braking time may be set, for example, in one level or more beforehand according to the rotation cycle of the generator, or may be set so that it is continuously changed according to the rotation cycle at that point.

The correction time for correcting the braking time may be in one level (fixed); however, setting the correction time in one level or more, preferably two levels or more, on the basis of the magnitude of the rotation cycle, i.e., the displacement from the reference cycle, makes it possible to bring the rotation cycle of the generator close to the reference cycle more quickly by extending the correction time even in case of a significant deviation from the reference cycle. Setting the correction time so that it is continuously changed according to the rotation cycle permits more detailed adjustment to be made.

Preferably, the brake control unit is provided with a count-up/down counter that receives one of the rotation detection signal and the reference signal as a count-up signal, receives the other as a count-down signal, and is configured so that if the value of the count-up/down counter is a set value or more, then a brake is applied to the generator, and if it is below the set value, then the brake applied to the generator is released.

Employing the count-up/down counter makes it possible to compare count values while counting rotation detection signals and reference signals at the same time, so that the construction will be further simpler and a difference between count values can be easily determined.

Preferably, the rotation control unit corrects the braking time made by the brake amount correcting unit only if the value of the count-up/down counter lies in a predetermined range that includes the set value.

Correcting the brake involves a shift from ON to OFF of the brake; hence, the brake cannot remain ON or OFF. For this reason, if the value on the count-up/down counter is considerably off from the vicinity of a set value that provides a threshold value of the brake control, then no brake correction is made to allow the brake to remain ON or OFF. This, for example, permits quick elimination of a cumulative error in a case where the rotation cycle considerably deviates from a reference cycle at the startup or the like of the generator.

An electronic device according to another aspect of the present invention is equipped with a mechanical energy source, a generator that is driven by the mechanical energy source, generates induced electric power, and supplies electrical energy, and a rotation control unit that is driven by the electrical energy and controls a rotation cycle of the generator, wherein the rotation control unit is equipped with a brake control unit that compares a reference signal issued on the basis of a signal from a time standard source with a rotation detection signal based on the rotation cycle of the generator thereby to adjust a high braking time during which a high brake is applied to the generator, and a brake amount correcting unit for correcting the high braking time set by the brake control unit on the basis of the rotation cycle of the generator.

At this time also, preferably, the brake amount correcting unit corrects the high braking time by making the high braking time shorter than the time set by the brake control unit if the rotation cycle of the generator is later than a predetermined range based on the cycle of the reference signal.

Furthermore, the brake amount correcting unit may correct the braking time by making the high braking time longer than the time set by the brake control unit if the rotation cycle of the generator is earlier than the predetermined range.

Preferably, the brake amount correcting unit corrects the braking time by making the high braking time shorter than the time set by the brake control unit if the rotation cycle of the generator is later than a predetermined range based on the cycle of the reference signal, or by making the high braking time longer than the time set by the brake control unit if the rotation cycle of the generator is earlier than the predetermined range.

In the present invention described above also, if the rotation cycle of the generator is close to the reference signal cycle, that is, if the rotation cycle lies in a predetermined range based on the reference signal cycle, then the brake control is conducted by the braking time set based on the comparison between the reference signal and a rotation detection signal performed by the brake control unit.

Furthermore, if the rotation cycle of the generator significantly deviates from the reference signal cycle, then the high braking time, i.e., the brake amount, is adjusted on the basis of the rotation cycle. For example, if the rotation cycle is shorter than the reference signal cycle, then the high braking time is made longer than the time set at the brake control unit so as to suppress the rotational speed of the generator thereby causing the rotation cycle to quickly approach the reference signal. If the rotation cycle is longer than the reference signal cycle, then the high braking time is made shorter than the time set at the brake control unit so as to increase the rotational speed of the generator, thereby causing the rotation cycle to quickly approach the reference signal.

With this arrangement, optimum brake control is conducted on the basis of the rotation cycle of the generator regardless of the reference cycle; hence, a secure and sufficient brake amount can be provided, and the responsiveness in speed control can be enhanced, as compared with the case where the brake-ON control and the brake-OFF control are always carried out in every cycle of the reference cycle. Thus, variations in the rotation cycle of a rotor of a generator can be reduced, allowing the generator to stably rotate at a substantially constant speed.

Preferably, the rotation control unit is equipped with a switch capable of forming a closed loop with both ends of the generator, and a chopper signal generating section that produces chopper signals of two or more types differing in at least duty ratio or frequency applied to the switch. To apply a high brake to the generator, one type of a chopper signal is applied to the switch, and in other cases, the other type of a chopper signal capable of causing the application of a brake that provides a weaker braking force than the high brake is applied to the switch.

By applying the chopper signals to the switch capable of forming the closed loop with both ends of the coil of the generator to turn the switch ON/OFF, that is, to perform choppering, the closed loop is formed with both ends of the coil of the generator thereby to apply a short brake, and energy is stored in the coil of the generator when the switch is turned ON. When the switch is turned OFF, the closed loop state is cleared, and the generator is actuated. Since there is the energy stored in the coil, an electromotive voltage is increased. Hence, carrying out control by the choppering when applying the high brake to the generator, the drop in the generated power at braking can be made up for by the increase in the electromotive voltage at the switching OFF. This makes it possible to configure an electronic device that is capable of increasing braking torque (brake torque) while suppressing a drop in the generated power at the same time, prolonging the lasting time.

Charging voltage can be further increased by carrying out the control also by choppering when applying the low brake.

The closed loop state that is set when the switch is turned ON may be a state wherein the braking force applied to the generator is greater than that applied in a non-closed loop state. A resistance element or the like may be provided between, for example, the switch and the generator on a circuit designed to have a closed loop.

The time during which the brake amount correcting unit adjusts the braking time may be set, for example, in one level or more beforehand according to the rotation cycle of the generator, or may be set so that it continuously changes according to the rotation cycle at that point.

Setting the correction time of the brake in one level or more, preferably two levels or more, on the basis of the magnitude of the rotation cycle, i.e., the displacement from the reference cycle, makes it possible to bring the rotation cycle of the generator close to the reference cycle more quickly by extending the correction time in case of a significant deviation from the reference cycle. Setting the correction time so that it is continuously changed according to the rotation cycle permits more detailed adjustment to be made.

The brake control unit is provided with a count-up/down counter that receives one of the rotation detection signal and the reference signal as a count-up signal, and receives the other as a count-down signal, and is configured so that if the value of the count-up/down counter is a set value or more, then the high brake is applied to the generator, or if it is below the set value, then the low brake is applied to the generator.

Employing the count-up/down counter makes it possible to compare count values while counting rotation detection signals and reference signals at the same time, so that the construction will be further simpler and a difference between count values can be easily determined.

The brake amount correcting unit may correct the high braking time only if the value of the count-up/down counter lies in a predetermined range that includes the set value.

Correcting the brake involves a shift from the high brake to the low brake; hence, it is impossible to keep on applying the high brake or the low brake. For this reason, if the value on the count-up/down counter is considerably off from the vicinity of a set value that provides a threshold value of the brake control, that is, further outside the range in which the correction is made, then no brake correction is made so as to allow the application of the high brake or the low brake to be continued. This, for example, permits quick elimination of a cumulative error in a case where the rotation cycle considerably deviates from a reference cycle at the startup or the like of the generator.

The electronic device is preferably a timing device, a music box, or a metronome. These will be able to provide clocking devices, music boxes, or metronomes that have prolonged lasting time, and are rotatively controlled with accuracy.

An electronically controlled mechanical timepiece according to the present invention is characterized in that it is provided with the electronic device described above, and hands that are rotated, together with driving of the generator, by the mechanical energy source of the electronic device and subjected to speed control by the rotation control unit.

To be more specific, the electronically controlled mechanical timepiece is provided with the mechanical energy source, the generator that is driven by the mechanical energy source coupled through the intermediary of an energy transmitting unit, such as a wheel train, and generates induced electric power to supply electrical energy, hands coupled to the energy transmitting unit, such as the wheel train, and a rotation control unit that is driven by the electrical energy to control the rotation cycle of the generator, wherein the rotation control unit is equipped with a brake control unit that compares a reference signal issued based on a signal from a time standard source with a rotation detection signal based on the rotation cycle of the generator to set a braking time of the generator, and a brake amount correcting unit for correcting the braking time set by the brake control unit on the basis of the rotation cycle of the generator.

The electronically controlled mechanical timepiece is provided with the mechanical energy source, the generator that is driven by the mechanical energy source coupled through the intermediary of an energy transmitting unit, such as a wheel train, and generates induced electric power to supply electrical energy, hands coupled to the energy transmitting unit, such as the wheel train, and a rotation control unit that is driven by the electrical energy to control the rotation cycle of the generator, the rotation control unit may be equipped with a brake control unit that compares a reference signal issued based on a signal from a time standard source with a rotation detection signal based on the rotation cycle of the generator to set a high braking time during which the high brake is applied to the generator, and a brake amount correcting unit for correcting the braking time set by the brake control unit on the basis of the rotation cycle of the generator.

According to the electronically controlled mechanical timepiece, variations in the rotation cycle of a rotor of a generator can be reduced, allowing the generator to rotate at a substantially constant speed, so that the swing of the needles of the hands operated by being interlocked with the rotation of the rotor can be reduced. Moreover, the brake torque of the generator can be increased while suppressing a drop in the generated power, so that a timepiece with high accuracy and prolonged lasting time can be provided.

The invention according to an aspect of the present invention is a control method for an electronic device provided with a mechanical energy source, a generator that is driven by the mechanical energy source, generates induced electric power, and supplies electrical energy, and a rotation control unit that is driven by the electrical energy and controls a rotation cycle of the generator, wherein a braking time of the generator is adjusted by comparing a reference signal issued based on a signal from a time standard source with a rotation detection signal based on the rotation cycle of the generator to adjust the braking time of the generator, and the braking time set by the brake control unit is corrected on the basis of the rotation cycle of the generator.

The invention according to another aspect of the present invention is a control method for an electronic device provided with a mechanical energy source, a generator that is driven by the mechanical energy source, generates induced electric power, and supplies electrical energy, and a rotation control unit that is driven by the electrical energy and controls a rotation cycle of the generator, wherein a high braking time during which high brake is applied to the generator is adjusted by comparing a reference signal issued based on a signal from a time standard source with a rotation detection signal based on the rotation cycle of the generator, and the high braking time set by the brake control unit is corrected on the basis of the rotation cycle of the generator.

The invention according to another aspect of the present invention is a control method for an electronically controlled mechanical timepiece provided with a mechanical energy source, a generator that is driven by the mechanical energy source coupled through the intermediary of an energy transmitting unit and generates induced electric power to supply electrical energy, hands coupled to the energy transmitting unit, and a rotation control unit that is driven by the electrical energy to control the rotation cycle of the generator, wherein a reference signal issued based on a signal from a time standard source is compared with a rotation detection signal based on the rotation cycle of the generator so as to adjust a braking time of the generator, and the braking time set by the brake control unit is corrected on the basis of the rotation cycle of the generator.

The invention according to another aspect of the present invention is a control method for an electronically controlled mechanical timepiece provided with a mechanical energy source, a generator that is driven by the mechanical energy source coupled through the intermediary of an energy transmitting unit and generates induced electric power to supply electrical energy, hands coupled to the energy transmitting unit, and a rotation control unit that is driven by the electrical energy to control the rotation cycle of the generator, wherein a reference signal issued based on a signal from a time standard source is compared with a rotation detection signal based on the rotation cycle of the generator so as to adjust a high braking time during which a high brake is applied to the generator, and the high braking time set by the brake control unit is corrected on the basis of the rotation cycle of the generator.

In each of these aspects of the present invention, to correct a braking time, it is preferable that, if the rotation cycle of the generator is later than a predetermined range based on the cycle of the reference signal, then the braking time is made shorter than the time set by comparing the reference signal and the rotation detection signal, or if the rotation cycle of the generator is earlier than the predetermined range, then the braking time is made longer than the time set by comparing the reference signal and the rotation detection signal, thereby correcting the braking time.

According to the control methods, if the rotation cycle of the generator is close to a reference signal cycle, that is, if the rotation cycle lies within a predetermined range based the reference signal cycle, then the comparison between the reference signal and the rotation detection signal is performed to carry out the brake control.

If the rotation cycle of the generator significantly deviates from the reference signal cycle, that is, if the rotation cycle lies outside the predetermined range based on the reference signal cycle, then the braking time or the high braking time is adjusted on the basis of the rotation cycle.

With this arrangement, optimum brake control is conducted on the basis of the rotation cycle of the generator regardless of the reference cycle; hence, a secure, sufficient brake amount is applied, and the responsiveness in speed control can be enhanced, as compared with the case where the brake-ON control and the brake-OFF control are always carried out in every cycle of the reference cycle. Thus, variations in the rotation cycle of a rotor of a generator can be reduced, allowing the generator to stably rotate at a substantially constant speed. Accordingly, variations in the rotation cycle of the rotor of a generator can be reduced, and the generator can be rotated at a substantially constant speed, permitting an electronic device and an electronically controlled mechanical timepiece featuring smooth operation to be achieved.

EMBODIMENTS

Embodiments of the present invention will now be described in conjunction with the accompanying drawings.

Figure 1:
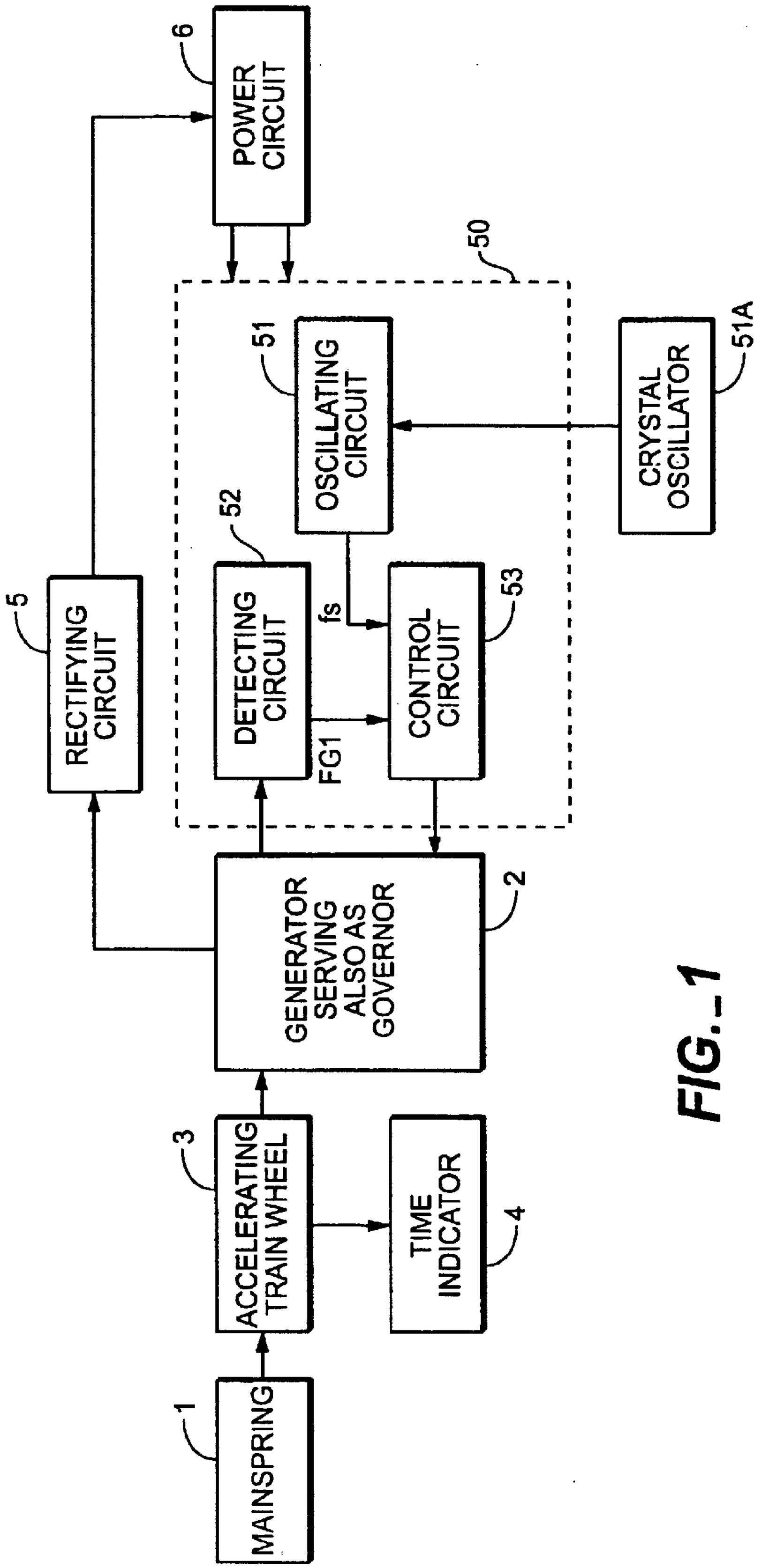
FIG. 1 is a block diagram of the construction of an essential section of an electronically controlled mechanical timepiece of a first embodiment according to the present invention.

FIG. 1 shows a block diagram illustrating an electronically controlled mechanical timepiece of a first embodiment according to the present invention.

The electronically controlled mechanical timepiece is equipped with a mainspring 1 acting as a mechanical energy source, an accelerating wheel train 3 acting as an energy transmitting assembly for transmitting the torque of the mainspring 1 to a generator 2, and hands 4 connected to the accelerating wheel train 3 to display time.

The generator 2 is driven by the mainspring 1 through the intermediary of the accelerating wheel train 3, and generates induced electric power to supply electrical energy. The AC output from the generator 2 is increased in voltage and rectified through a rectifying circuit 5 constituted by step-up rectification, full-wave rectification, half-wave rectification, transistor rectification, etc., and supplied and charged into a power circuit 6 constructed by a capacitor or the like.

Figure 2:
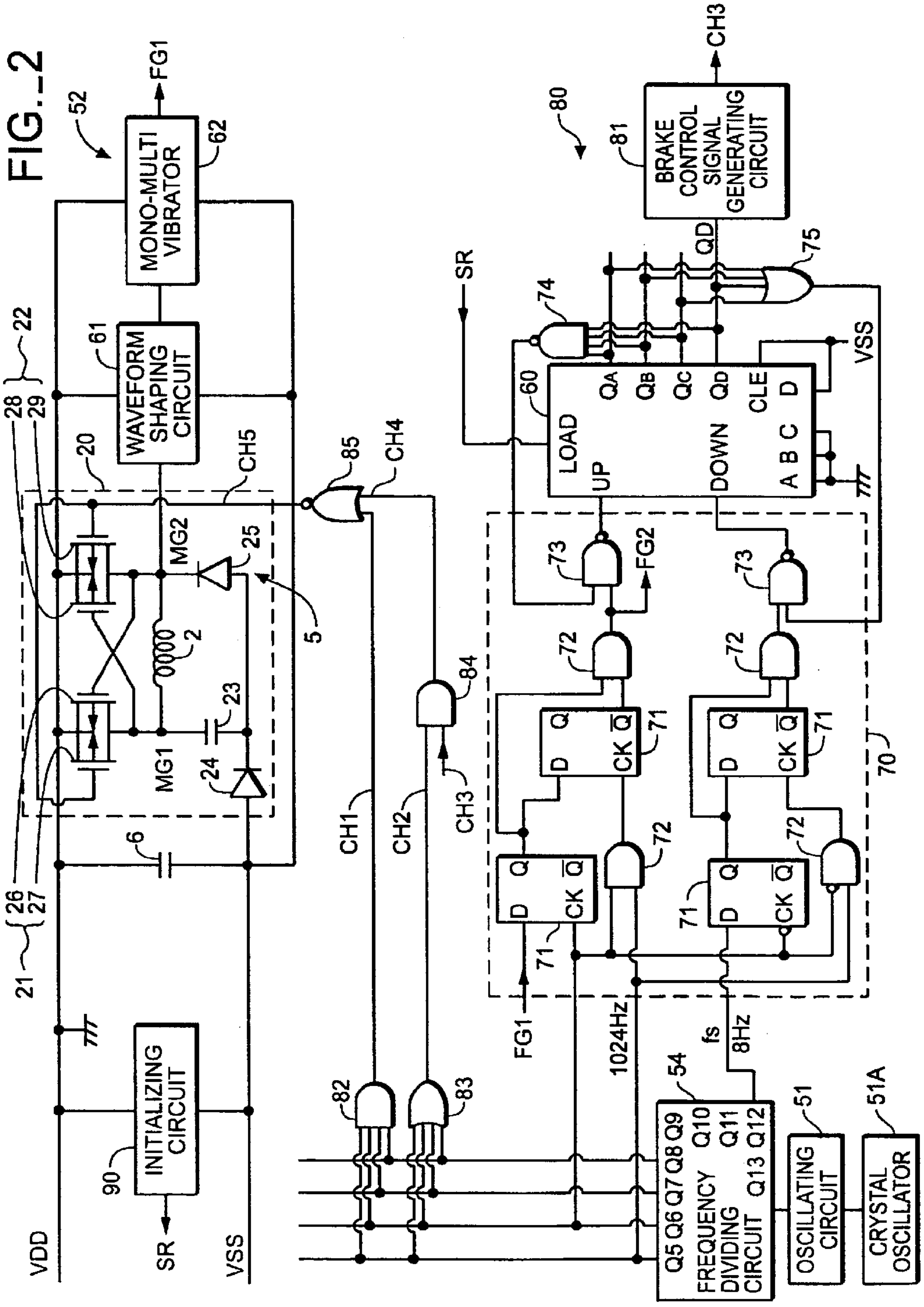
FIG. 2 is a circuit diagram showing the construction of the electronically controlled mechanical timepiece of the first embodiment.

In this embodiment, as shown in FIG. 2, the generator 2 is provided with a brake circuit 20 that includes the rectifying circuit 5. The brake circuit 20 has a first switch 21 connected to a first AC input terminal MG1 to which an AC signal (AC current) generated by the generator 2 is applied, and a second switch 22 connected to a second AC input terminal MG2 to which the AC signal is applied. By turning ON these switches 21 and 22, the first and second AC input terminals MG1 and MG2 are short-circuited to form a closed loop, thereby applying a short brake.

The first switch 21 is configured by a first field effect transistor (FET) 26 of Pch having its gate connected to the second AC input terminal MG2, and a second field effect transistor 27, the gate of which receives a chopper signal (chopper pulse) CH5 from a chopper signal generating section 80, which will be described hereinafter, the transistors 26 and 27 being connected in parallel.

The second switch 22 is configured by a third field effect transistor (FET) 28 of Pch having its gate connected to the first AC input terminal MG1, and a fourth field effect transistor 29, the gate of which receives the chopper signal CH5 from the chopper signal generating section 80, the transistors 28 and 29 being connected in parallel.

Furthermore, a voltage doubler rectifying circuit 5 is constructed by a step-up capacitor 23 connected to the generator 2, diodes 24 and 25, and switches 21 and 22. Any type of diodes may be used as the diodes 24 and 25 as long as they are unidirectional elements for passing current in one direction. Especially in the case of an electronically controlled mechanical timepiece, the electromotive voltage of the generator 2 is small. Preferably, therefore, Schottky barrier diodes or silicon diodes having smaller falling voltage Vf and inverse leakage current are used for the diodes 24 and 25. The DC signals that have been rectified by the rectifying circuit 5 are charged into the power circuit (capacitor) 6.

The brake circuit 20 is controlled by a rotation control unit 50 driven by the electric power supplied from the power circuit 6. The rotation control unit 50 is constructed by an oscillating circuit 51, a detecting circuit 52, and a control circuit 53, as shown in FIG. 1.

The oscillating circuit 51 employs a crystal oscillator 51A, which is a time standard source, to issue an oscillation signal (32768 Hz). The frequency of the oscillation signal is divided into a certain fixed cycle by a frequency dividing circuit 54 composed of a flip-flop of twelve stages. An output Q12 of the twelfth stage of the frequency dividing circuit 54 is output in the form of an 8 Hz reference signal fs.

The detecting circuit 52 is constituted by a waveform shaping circuit 61 connected to the generator 2 and a mono-multi vibrator 62. The waveform shaping circuit 61 composed of an amplifier and a comparator converts a sinusoidal wave into a rectangular wave. The mono-multi vibrator 62 acts as a band-pass filter that allows only those pulses having a predetermined frequency or less to pass therethrough so as to output a rotation detection signal FG1 from which noises have been removed.

The control circuit 53 is provided with a count-up/down counter 60 acting as a brake control unit, a synchronous circuit 70, and a chopper signal generating section 80.

The count up inputs and count down inputs of the count-up/down counter 60 receive the rotation detection signal FG1 of the detecting circuit 52 and the reference signal fs from the frequency dividing circuit 54 through the intermediary of the synchronous circuit 70.

The synchronous circuit 70 is composed of four flip-flops 71, AND gates 72, and NAND gates 73. The rotation detection signal FG1 is synchronized with the reference signal fs (8 Hz) by using an output Q5 (1024 Hz) of a fifth stage or an output Q6 (512 Hz) of a sixth stage of the frequency dividing circuit 54. At the same time, adjustment is made so that these signal pulses are not overlapped when they are output.

The count-up/down counter 60 is formed of a four-bit counter. The count up input of the count-up/down counter 60 receives a signal based on the rotation detection signal FG1 from the synchronous circuit 70, while the count down input receives a signal based on the reference signal fs from the synchronous circuit 70. This makes it possible to simultaneously count the reference signal fs and the rotation detection signal FG1 and calculate the difference therebetween.

The count-up/down counter 60 is provided with four data input terminals (preset terminals) A through D. The application of H-level signals to the terminals A through C sets an initial value (preset value) of the count-up/down counter 60 as a counter value 7.

An initializing circuit 90 that is connected to the power circuit 6 and outputs a system reset signal SR according to the voltage of the power circuit 6 is connected to a LOAD input terminal of the count-up/down counter 60. In this embodiment, the initializing circuit 90 is configured so that it issues the H-level signal until the charging voltage of the power circuit 6 reaches a predetermined voltage, and issues an L-level signal when the charging voltage exceeds the predetermined voltage.

The count-up/down counter 60 does not accept any up or down inputs until the LOAD input is switched to the L-level, that is, until the system reset signal SR is issued. Hence, the counter value of the count-up/down counter 60 is maintained at "7".

The count-up/down counter 60 has four bits of outputs QA through QD. Thus, the output QD of the fourth bit issues an L-level signal if the counter value is 7 or less, or issues a H-level signal if the counter value is 8 or more. The output QD is connected to the chopper signal generating section 80.

The outputs of a NAND gate 74 and an OR gate 75 that have received the outputs QA through QD are respectively supplied to the NAND gates 73 to which the outputs from the synchronous circuit 70 are supplied. Thus, it is set so that, for example, if a plurality of count-up signals are received, causing the counter value to be set to "15", the NAND gate 74 issues an L-level signal, and even if another count-up signal is applied to the NAND gate 73, the input is canceled and no more count-up signal is applied to the count-up/down counter 60. Similarly, when the counter value becomes "0", an L-level signal is issued from the OR gate 75, so that the input of a count-down signal is cancelled. This arrangement prevents the counter value from going beyond "15" and reaching "0", or from going beyond "0" and reaching "15".

The chopper signal generating section 80 is equipped with an AND gate 82 that uses outputs Q5 through Q8 of the frequency dividing circuit 54 to output a first chopper signal CH1, an OR gate 83 that outputs a second chopper signal CH2, a brake control signal generating circuit 81 that uses the output QD, etc. of the count-up/down counter 60 to output a chopper signal CH3 that provides a brake control signal, each AND gate 84 that receives the chopper signals CH2 and CH3, and a NOR gates 85 that receives an output CH4 of each AND gate 84 and the output CH1.

An output CH5 from the NOR gate 85 of the chopper signal generating section 80 is applied to the gates of the Pch transistors 27 and 29. Accordingly, as long as the chopper output CH5 remains at the L-level, the transistors 27 and 29 are held ON, and the generator 2 is short-circuited, thus applying a brake.

Conversely, as long as the output CH5 remains at the H-level, the transistors 27 and 29 are held OFF, and no brake is applied to the generator 2. Thus, the generator 2 can be subjected to the choppering control by using the chopper signals from the output CH5.

The duty ratio of each of the chopper signals CH1 and CH2 is the ratio of the time during which a brake is applied to the generator 2 during one cycle in each of the chopper signals, and it is the ratio of the time during which the H-level continues in one cycle in each of the chopper signals CH1 and CH2 in this embodiment.

Figure 3:
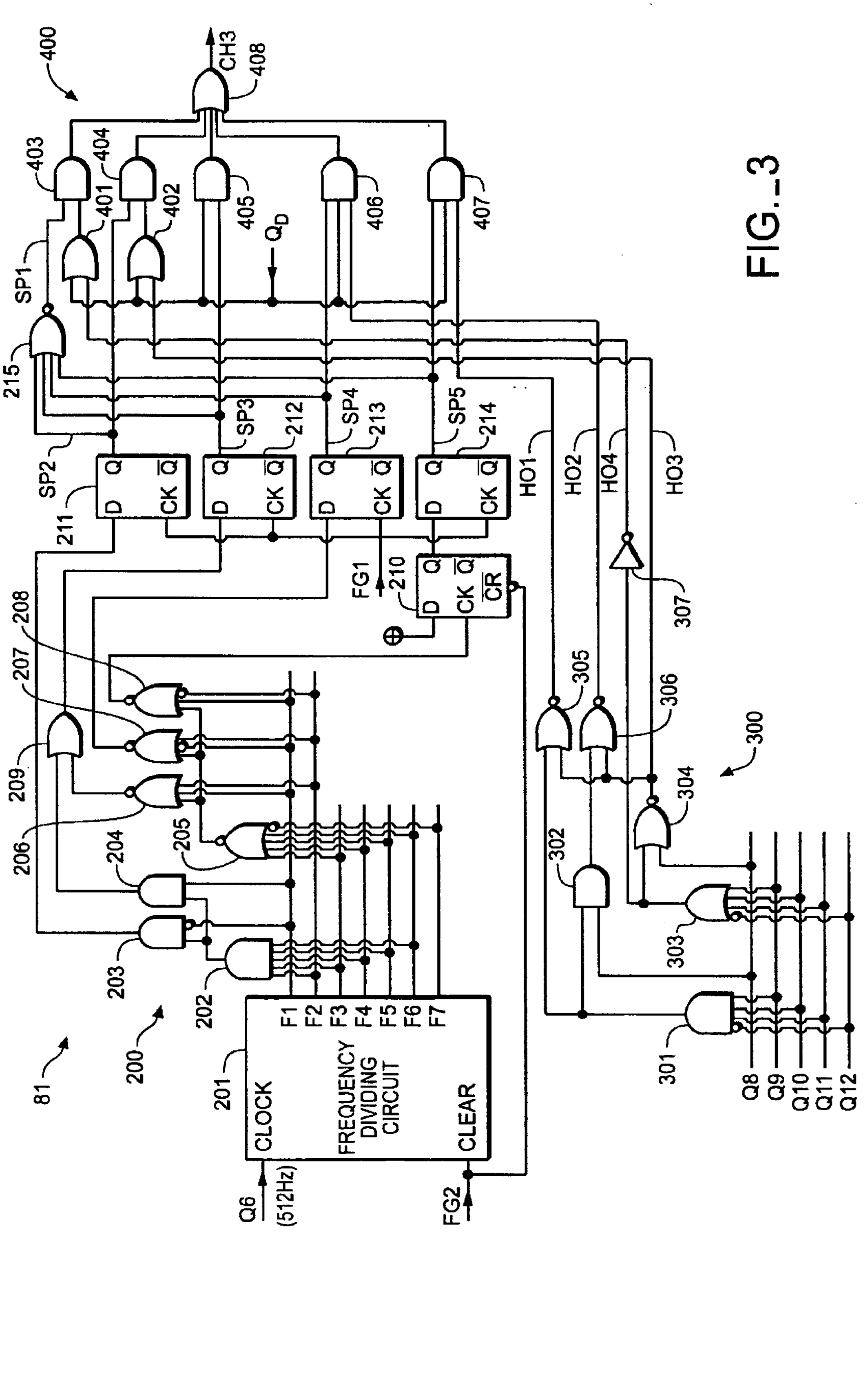
FIG. 3 is a circuit diagram showing the construction of a brake control signal generating circuit of the first embodiment.

The brake control signal generating circuit 81 is constructed by a rotation cycle detecting circuit 200, a brake amount correcting circuit 300, and a signal selecting circuit 400, as shown in FIG. 3.

The rotation cycle detecting circuit 200 is provided with a seven-stage frequency dividing circuit 201 that employs an output Q6 (512 Hz) of the frequency dividing circuit 54 as a clock input, and an output FG2 of the AND gate 72 as a clear input, an AND gate 202 to which outputs F2 through F6 of the frequency dividing circuit 201 are supplied, AND gates 203 and 204 to which the outputs of the AND gate 202 and an output F1 are supplied, an OR gate 205 to which outputs F3 through F7 are supplied, NOR gates 206 through 208 to which the outputs of the OR gate 205 and outputs F1 and F2 are supplied, and an OR gate 209 to which the outputs of the AND gate 204 and the NOR gate 206 are supplied. The output FG2 is a pulse signal that is output substantially in synchronization with the rise of the rotation detection signal FG1, i.e., output once for each cycle of the rotation detection signal FG1.

Furthermore, the rotation cycle detecting circuit 200 is provided with a flip-flop 210 that employs the outputs of the NOR gate 208 as clock inputs, and the output FG2 as a clear input, flip-flops 211 through 214 that receive an output Q of the flip-flop 210 and the outputs of the AND gate 203, the OR gate 209, and the NOR gate 207 as data input, and the rotation detection signal FG1 as a clock input, and a NOR gate 215 to which outputs SP2 through SP5 of the flop-flops 211 through 214 are supplied.

The rotation cycle detecting circuit 200 configured as described above is able to detect the rotation cycle of the rotation detection signal FG1, and output the detected rotation cycle through the flip-flops 211 through 214 and the outputs SP1 through SP5 of the NOR gate 215.

To be more specific, in this embodiment, the output SP1 is set to "H" when the rotation cycle of the rotor is below 121 ms, while it is set to "L" if the rotation cycle of the rotor is other than that. Similarly, the output SP2 is set to "H" only when the rotation cycle ranges from 121 to 123 ms (121 ms or more and below 123 ms: the same will apply hereinafter), the output SP3 is set to "H" only when the rotation cycle ranges from 123 to 127 ms, the output SP4 is set to "H" only when the rotation cycle ranges from 127 to 129 ms, and the output SP5 is set to "H" only when the rotation cycle is 129 ms or more. In other words, an arrangement has been made so that the rotation cycle can be detected in a total of five levels by using the reference cycle (8 Hz=125 ms) as the center, one level representing a case where the rotation cycle substantially agrees with the reference cycle, two levels for a rotation cycle that is earlier than the reference cycle, and two levels for a rotation cycle that is later than the reference cycle.

Figure 6:
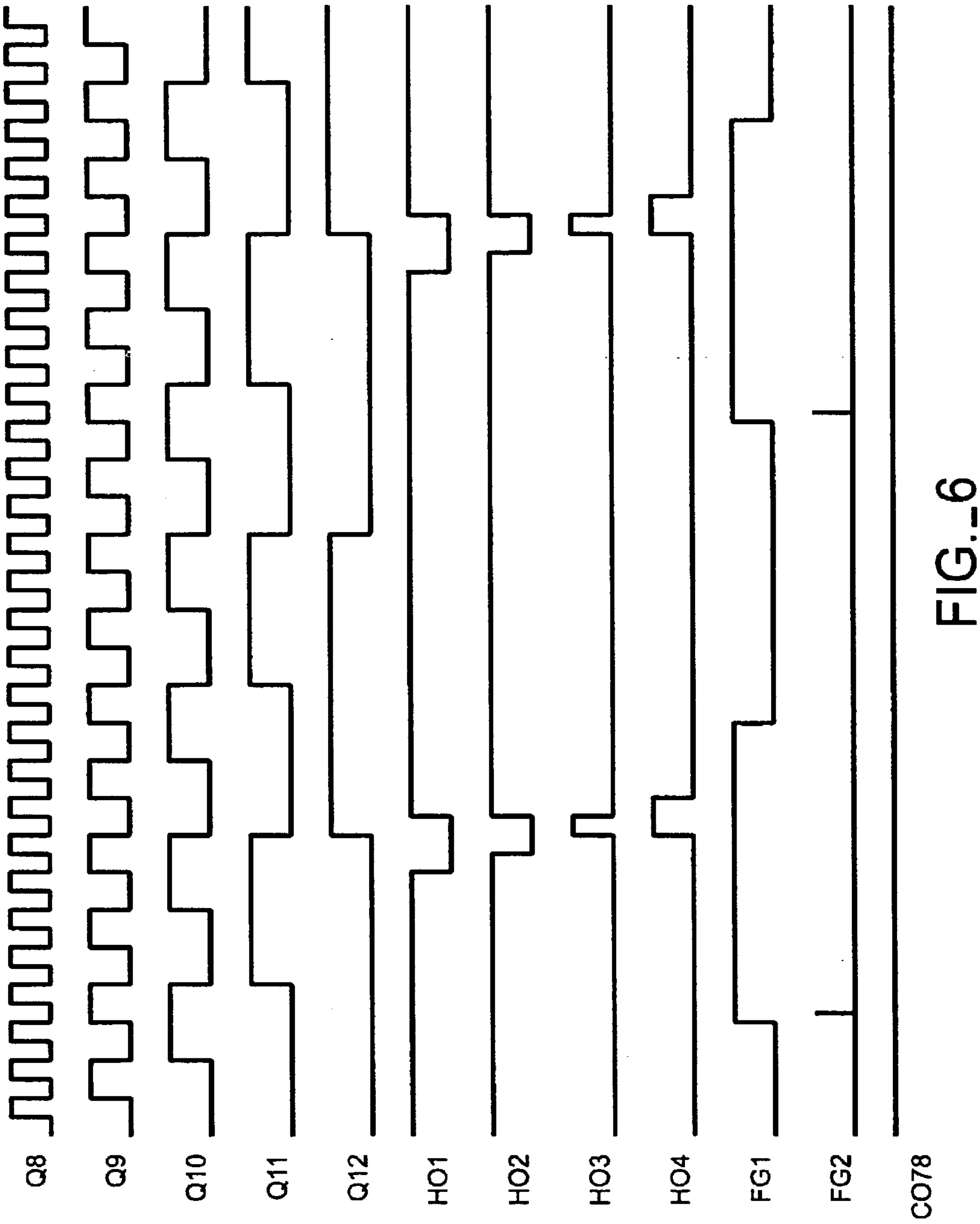
FIG. 6 is a timing chart in the chopper signal generating section of the first embodiment.

The brake amount correcting circuit 300 is constituted by AND gates 301 and 302, an OR gate 303, NOR gates 304 through 306, and a NOT gate 307, and uses outputs Q8 through Q12 of the frequency dividing circuit 54 to output correction signals H01 through H04 shown in FIG. 6.

A signal selecting circuit 400 constituted by OR gates 401 and 402, AND gates 403 through 407, and an OR gate 408 combines the output QD of the count-up/down counter 60, the outputs SP1 through SP5, and the correction signals H01 through H04, and adjusts the output QD by one of the correction signals H01 to H04 that corresponds to an output indicating an H-level signal among the outputs SP1 through SP5, then outputs the brake control signal CH3. If the output SP3 indicates an H-level signal, then the output QD directly provides the brake control signal CH3 without any correction.

The correction signals H01 through H04 are the signals for correcting the shift timing at which the brake control signal CH3, which depends on the output QD of the count-up/down counter 60, is switched from the H-level to the L-level, i.e., the shift timing at which the control for applying the high brake (high brake control) is switched to the control for applying the low brake (low brake control), according to the outputs of the outputs SP1 through SP5 of the rotation cycle detecting circuit 200, i.e., the rotation cycle of the rotor.

More specifically, as illustrated in FIG. 6, the correction signal H01 is set such that it is switched to an L-level signal one cycle of Q8 (128 Hz), namely, approximately 7.8 ms, before the rise timing of the output Q12, and switched to an H-level signal approximately 3.9 ms (Q7, i.e., one cycle of 256 Hz) after the rise of the output Q12.

Similarly, the correction signal H02 is set such that it is switched to an L-level signal approximately 3.9 ms before the rise timing of the output Q12, and switched to an H-level signal approximately 3.9 ms after the rise of the output Q12.

These signals H01 and H02 are set such that they are switched to the H-level signals in approximately 3.9 ms rather than being switched to the H-level signals at the rise timing of the output Q12 because the signal FG2 is output after the rotation detection signal FG1 is passed through two flip-flops 71. In other words, a difference of a maximum of approximately 2 ms is produced between the shift timing of FG1 and the signal FG2, so that this difference is taken into account.

The correction signal H03 is set such that it is switched to an H-level signal at the rise timing of the output Q12, then switched to an L-level signal after approximately 3.9 ms.

The correction signal H04 is set such that it is switched to an H-level signal at the rise timing of the output Q12, then switched to an L-level signal after approximately 7.8 ms.

Thus, according to this embodiment, the rotation cycle detecting circuit 200, the brake amount correcting circuit 300, and the signal selecting circuit 400 make up the brake amount correcting unit.

In the present invention, the high brake and the low brake are relative, and the high brake means that the braking force is greater than that of the low brake. A specific braking force in each brake, namely, the duty ratio and frequency of a chopper brake signal may be set as appropriate in actual operation.

The operation of the embodiment will now be described with reference to the timing charts of FIG. 4 through FIG. 7 and the flowchart of FIG. 8.

Figure 4:
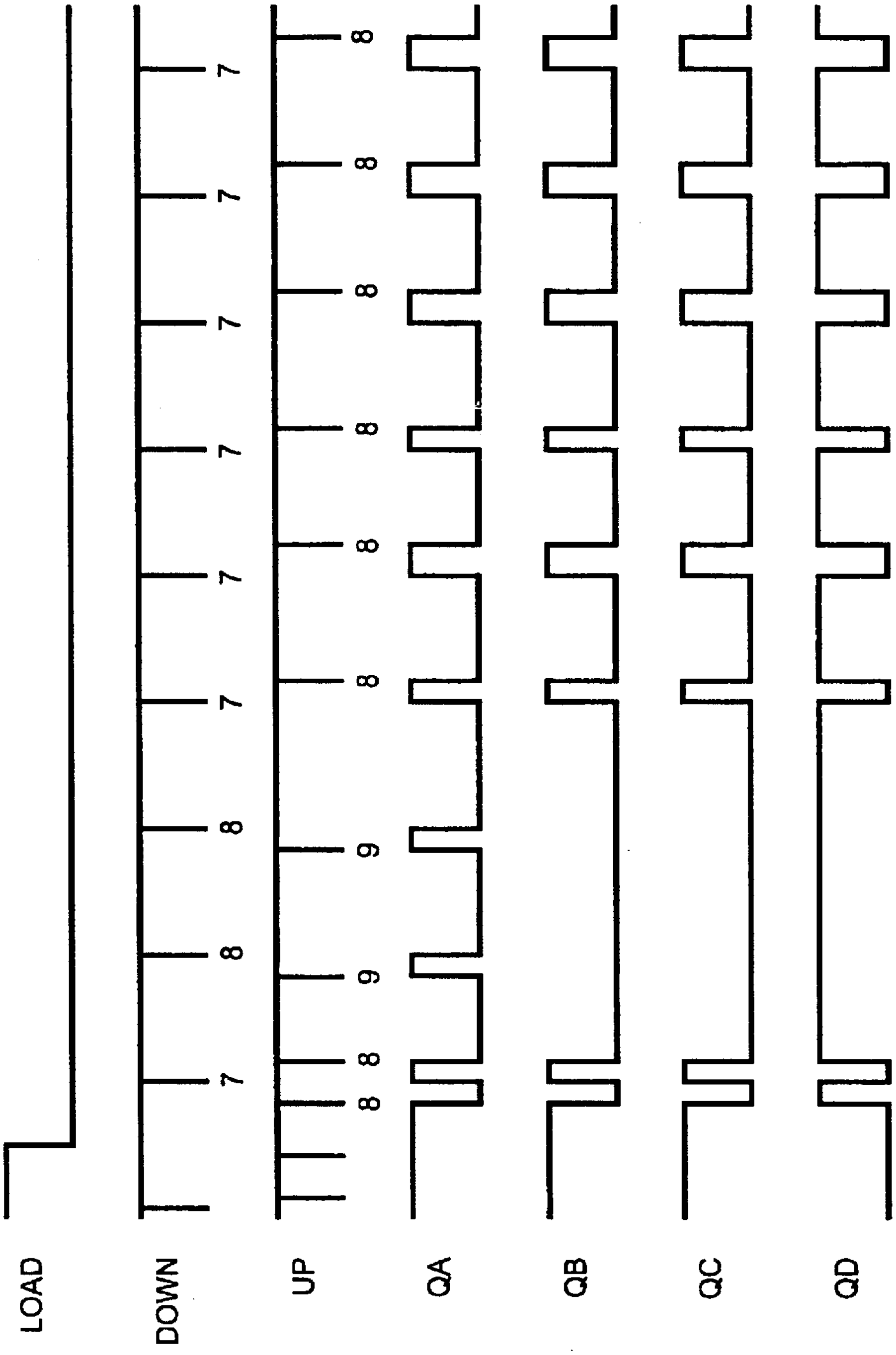
FIG. 4 is a timing chart in a count-up/down counter of the first embodiment.

When the generator 2 starts to operate, and the system reset signal SR at the L-level is supplied from the initializing circuit 90 to the LOAD input of the count-up/down counter 60, the count-up signals based on the rotation detection signal GF1 and the count-down signals based on the reference signal fs are counted by the count-up/down counter 60 (step 1: the steps will be denoted by "S" hereinafter), as shown in FIG. 4. These signals are set by the synchronous circuit 70 such that they are not simultaneously supplied to the counter 60.

Hence, when a count-up signal is received in a state wherein the initial count value has been set to "7", the counter value will be "8", and an H-level signal is supplied from the output QD to the brake control signal generating circuit 81 of the chopper signal generating section 80.

Conversely, if a count-down signal is supplied, causing the counter value to go back to "7", then an L-level signal is issued from the output QD.

Figure 5:
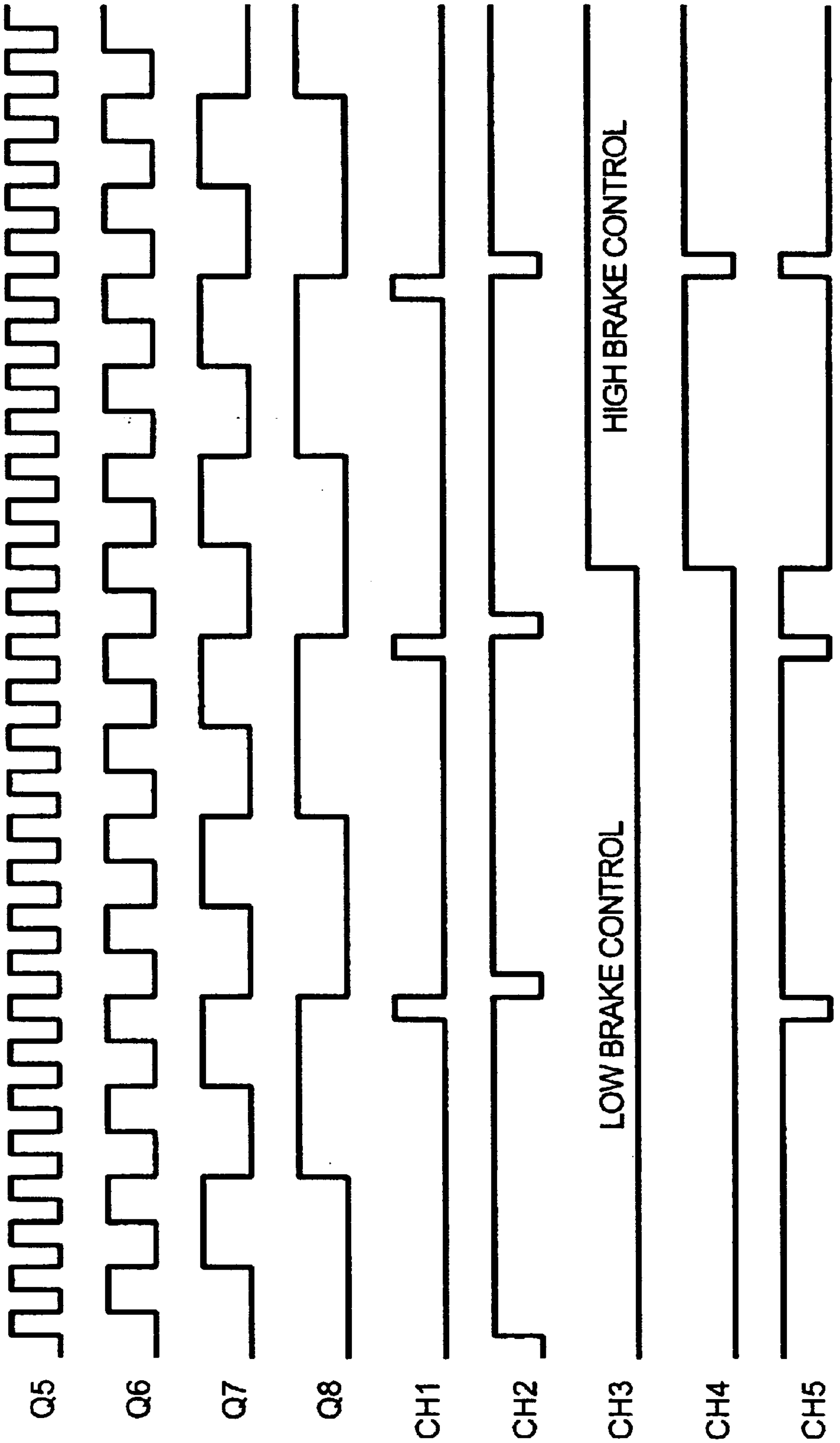
FIG. 5 is a timing chart in a chopper signal generating section of the first embodiment.

In the brake control signal generating circuit 81 of the chopper signal generating section 80, the chopper signals CH1 and CH2 are output using the outputs Q5 through Q8 of the frequency dividing circuit 54, as shown in FIG. 5.

The brake control signal CH3 is output based on the output QD of the count-up/down counter 60 that is supplied to the brake control signal generating circuit 81. At this time, in the brake control signal generating circuit 81, the rotation cycle of the rotor is detected in units of cycles (S2), and a predetermined correction signal H01 to H04 is added to the brake control signal CH3 on the basis of the detected rotation cycle, thereby adjusting the high braking time.

Figure 7:
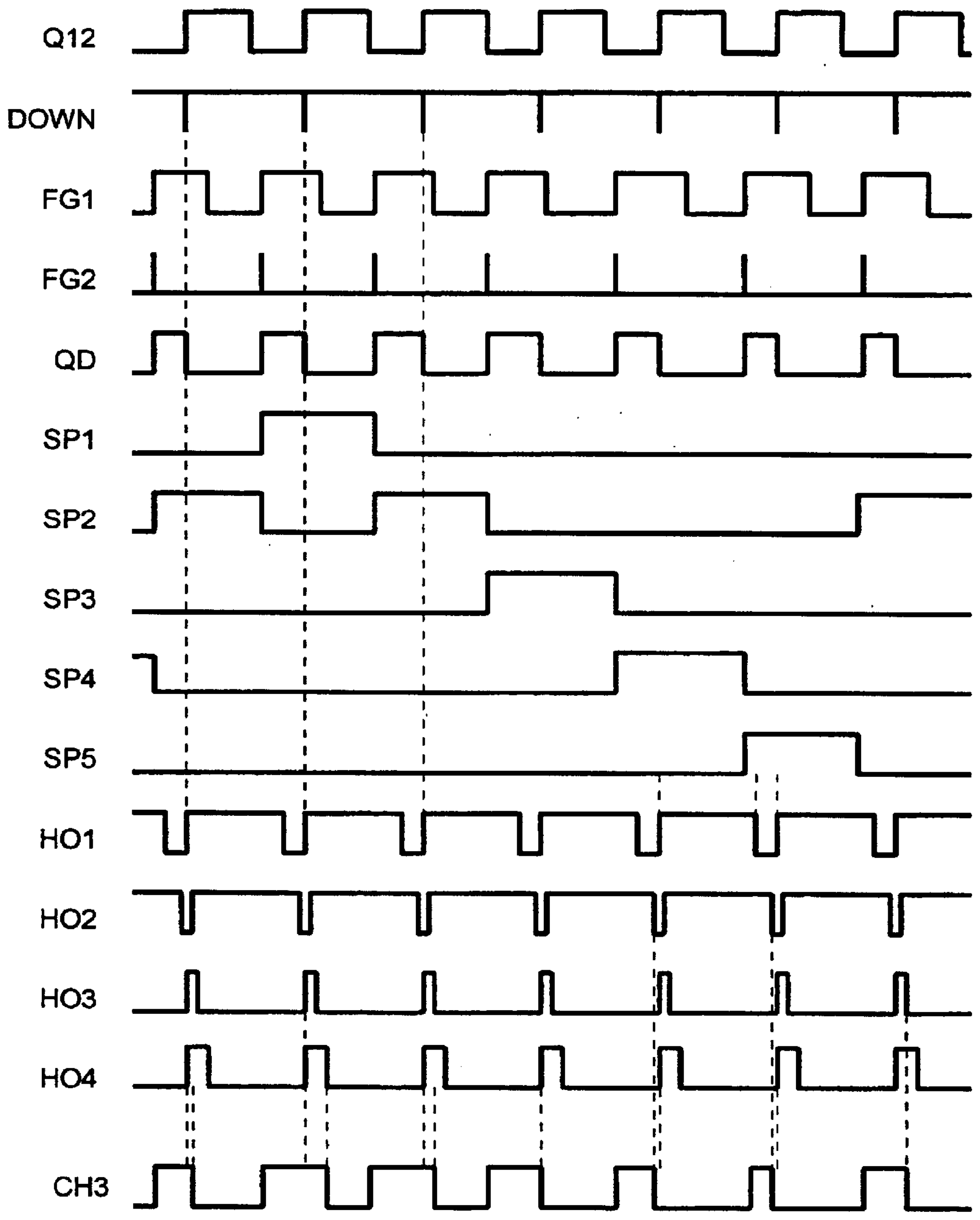
FIG. 7 is a timing chart in a brake control signal generating circuit of the first embodiment.
Figure 8:
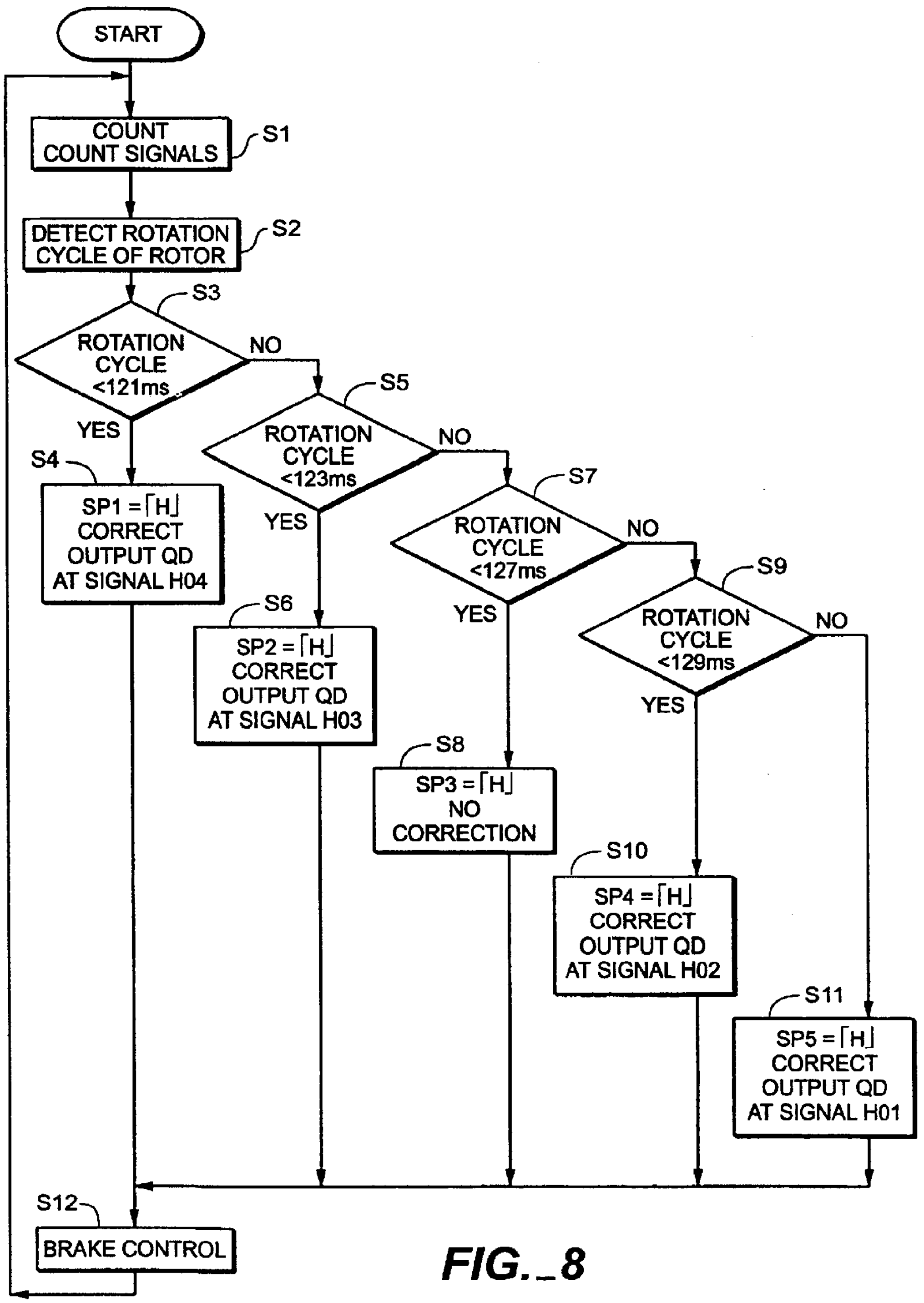
FIG. 8 is a flowchart for explaining the operation of the first embodiment.

More specifically, as shown in FIG. 7, if the rotation cycle of the rotor is below 121 ms (reference signal fs=8 Hz; if it is earlier than the rotation cycle of 125 ms; S3), then the SP1 is switched to an H-level signal. Therefore, the brake control signal CH3 will be a signal obtained by combining the output QD and the correction signal H04 at the OR gate 401, i.e., a signal in which a fall time, namely, the high braking time during which the high brake is applied, is longer by the correction signal H04 than the fall time of the output QD (S4).

Similarly, if the rotation cycle of the rotor ranges from 121 to 123 ms (S5), then the SP2 is switched to an H-level signal; therefore, the brake control signal CH3 will be a signal obtained by combining the output QD and the correction signal H03 at the OR gate 402, that is, a signal in which the fall time, namely, the high braking time, is longer by the correction signal H03 than the fall time of the output QD (S6).

Furthermore, if the rotation cycle of the rotor ranges from 123 to 127 ms (substantially the same as the reference signal cycle: S7), then the SP3 will be an H-level signal, so that the brake control signal CH3 will be a signal composed of a direct output of the output QD (S8).

If the rotation cycle of the rotor ranges from 127 to 129 ms (if it is later than the reference signal cycle: S9), then the SP4 is switched to an H-level signal; therefore, the brake control signal CH3 will be a signal obtained by combining the output QD and the correction signal H02 at the AND gate 406, i.e., a signal in which a fall time, namely, the high braking time, is shorter by the correction signal H02 than the fall time of the output QD (S10).

If the rotation cycle of the rotor is 129 ms or more (if it is later than the reference signal cycle: S9), then the SP5 is switched to an H-level signal; therefore, the brake control signal CH3 will be a signal obtained by combining the output QD and the correction signal H01 at the AND gate 407, i.e., a signal in which a fall time, namely, the high braking time, is shorter by the correction signal H01 than the fall time of the output QD (S11).

Then, the brake control is carried out by the brake control signal CH3 that has been corrected on the basis of the rotation cycle (S12).

To be more specific, if an L-level signal is being output from the brake control signal CH3 (the counter value is "7" or less), then the output CH4 will be also an L-level signal. Hence, as shown in FIG. 5, the output CH5 from the NOR gate 85 will be a chopper signal obtained by inverting the output CH1, i.e., a chopper signal that has a long H-level period (brake off period) of 15/16 and a short L-level period (brake on period) of 1/16, which means a small (1/16) duty ratio (the ratio at which the switch 21 or 22 is ON) for conducting the low brake control. Accordingly, the low brake control that gives priority to power generation is carried out on the generator 2.

Conversely, if an H-level signal is being output from the brake control signal CH3 (the counter value is "8" or more), then the chopper signal CH2 is directly output as it is from the AND gate 84, and the output CH4 will be identical to the chopper signal CH2. Hence, the output CH5 from the NOR gate 85 will be a chopper signal obtained by inverting the output CH2, i.e., a chopper signal that has a short H-level period (brake off period) of 1/16, and a short L-level period (brake on period) of 15/16, meaning a large (15/16) duty ratio for conducting the high brake control. Therefore, the chopper signal CH5 provides a longer total time of the L-level signal for applying a short brake to the generator 2, and the high brake control is carried out on the generator 2. However, the signal is switched to an H-level signal at a fixed cycle, and the short brake is turned OFF, thus conducting the choppering control. With this arrangement, the braking torque can be improved while suppressing a drop in generated power.

Accordingly, the high brake control is implemented by the chopper signal having a large duty ratio while an H-level signal is being issued from the output QD of the count-up/down counter 60, whereas the low brake control is conducted by the chopper signal having a small duty ratio while an L-level signal is being issued. In other words, the count-up/down counter 60 acting as the brake control unit switches between the high brake control and the low brake control.

At this time, as described above, the cycle of the rotation detection signal FG1 of the rotor is detected by the rotation cycle detecting circuit 200, and the detected rotation cycle is classified into one of the total five levels, namely, a level wherein the detected rotation cycle is substantially equal to the reference signal cycle, the levels wherein the detected rotation cycle is earlier (two levels), and the levels wherein the detected rotation cycle is later (two levels). Based on the classification result, the time during which the high brake control is carried out by the brake control signal CH3, i.e., the period of an H-level signal, is adjusted.

If the rotation cycle of the rotation detection signal FG1 is earlier than the reference signal cycle, then the correction signals H03 and H04 are added to cause the brake control signal CH3 to be a signal in which the fall time, i.e., the high brake control time, is made longer than at the fall of the output QD by the correction signals H03 and H04. This causes higher brake than usual to be applied to the rotor, so that the speed is quickly controlled to the reference cycle.

If the rotation cycle of the rotation detection signal FG1 is later than the reference signal cycle, then the correction signals H01 and H02 are added to cause the brake control signal CH3 to be a signal in which the fall time, i.e., the high brake control time, is made shorter than at the fall of the output QD by the correction signals H01 and H02. This reduces the braking force to be applied to the rotor, so that the rotational speed of the rotor is increased and quickly controlled to the reference cycle.

Repeating the braking control described above brings the generator 2 close to a set rotational speed. As shown in FIG. 4, the count up signals and the count down signals are alternately input, leading to a locked state wherein the counter values of "8" and "7" are repeated. At this time, the high brake control and the low brake control are repeated on the basis of the counter value and the rotation cycle.

As the mainspring 1 is unwound with resultant decreasing torque, and more count down values are input, causing the count value to be a small value of "6" or less, it is determined that the torque of the mainspring 1 has dropped, and the operation of the hands is stopped or extremely slowed down, or a buzzer, lamp, or the like is sounded or lit so as to prompt the user to wind up the mainspring 1 again.

This embodiment described above provides the following advantages:

(1) To generate the brake control signal CH3 for controlling the brake of the generator 2 in the brake control signal generating circuit 81, the rotation cycle of the rotor is detected, and the correction signals H01 to H04 that have been selected on the basis of the detected rotation cycle are used to adjust the brake control signal CH3, thus making it possible to adjust the rotation cycle of the rotor so that it is quickly brought close to the reference signal.

With this arrangement, optimum brake control can be conducted on the basis of the rotation cycle of the generator 2 regardless of the reference cycle; hence, a secure, sufficient brake amount is applied, and the responsiveness in speed control can be enhanced, as compared with the case where the brake on control and the brake off control are always carried out in every cycle of the reference cycle. Thus, variations in the rotation cycle of a rotor of a generator 2 can be reduced, allowing the generator 2 to stably rotate at a substantially constant speed.

(2) The high brake control is conducted using a chopper signal having a large duty ratio, so that the braking torque can be increase while suppressing a drop in the charging voltage, making it possible to perform efficient brake control while maintaining the stability of the system. This permits an extended lasting time of the electronically controlled mechanical timepiece.

(3) Furthermore, for the low brake control, the chopper control is carried out using a chopper signal having a smaller duty ratio, so that the charging voltage obtained while the low brake is being applied can be further improved.

(4) The switching between the high brake control and the low brake control is made simply by determining whether the counter value is "7" or less or "8" or more. Therefore, the construction of the rotation control unit 50 can be made simpler, and component cost and manufacturing cost can be reduced, allowing the electronically controlled mechanical timepiece to be provided at a lower price.

(5) The timing at which a count up signal is input is changed on the basis of the rotational speed of the generator 2, so that the period during which the counter value remains to be "8", i.e., the time during which a brake is applied, can be automatically adjusted. With this arrangement, especially in the lock state wherein count up signals and count down signals are alternately input, stable control with high responsiveness can be conducted.

(6) Since the count-up/down counter 60 is employed as the brake control unit, the comparison (difference) between count values can be automatically calculated while counting count up signals and count down signals at the same time. This allows the construction to be made simpler, and the difference between count values to be easily determined.

(7) Since the count-up/down counter 60 of four bits is used, sixteen count values can be counted. Hence, in such a case where count up signals are input in succession, the input values can be cumulatively counted, making it possible to correct a cumulative error within a set range, namely, until count up signals or count down signals are successively input and the counter value reaches "15" or "0". Therefore, even if the rotational speed of the generator 2 considerably deviates from a reference speed, the cumulative error can be securely corrected to bring the rotational speed of the generator 2 back to the reference speed although it may take some time until the locked state is set. In the long term, accurate operation of the hands can be maintained.

(8) The initializing circuit 90 is provided not to carry out the brake control until the power circuit 6 is charged up to a predetermined voltage when the generator 2 is started, thereby preventing a brake from being applied to the generator 2. Hence, priority can be given to the charging of the power circuit 6, and the rotation control unit 50 driven by the power circuit 6 can be driven quickly and stably, making it possible to enhance the stability of the rotation control thereafter.

(9) The brake control signal generating circuit 81 is formed using various logic circuits, so that the circuit can be made smaller, permitting power saving. The rotation cycle detecting circuit 200, in particular, uses the flip-flops 210 through 214 or the like, the circuit configuration can be simplified and the data can be easily utilized, as compared with a case where other rotation detector or the like is used.

Figure 9:
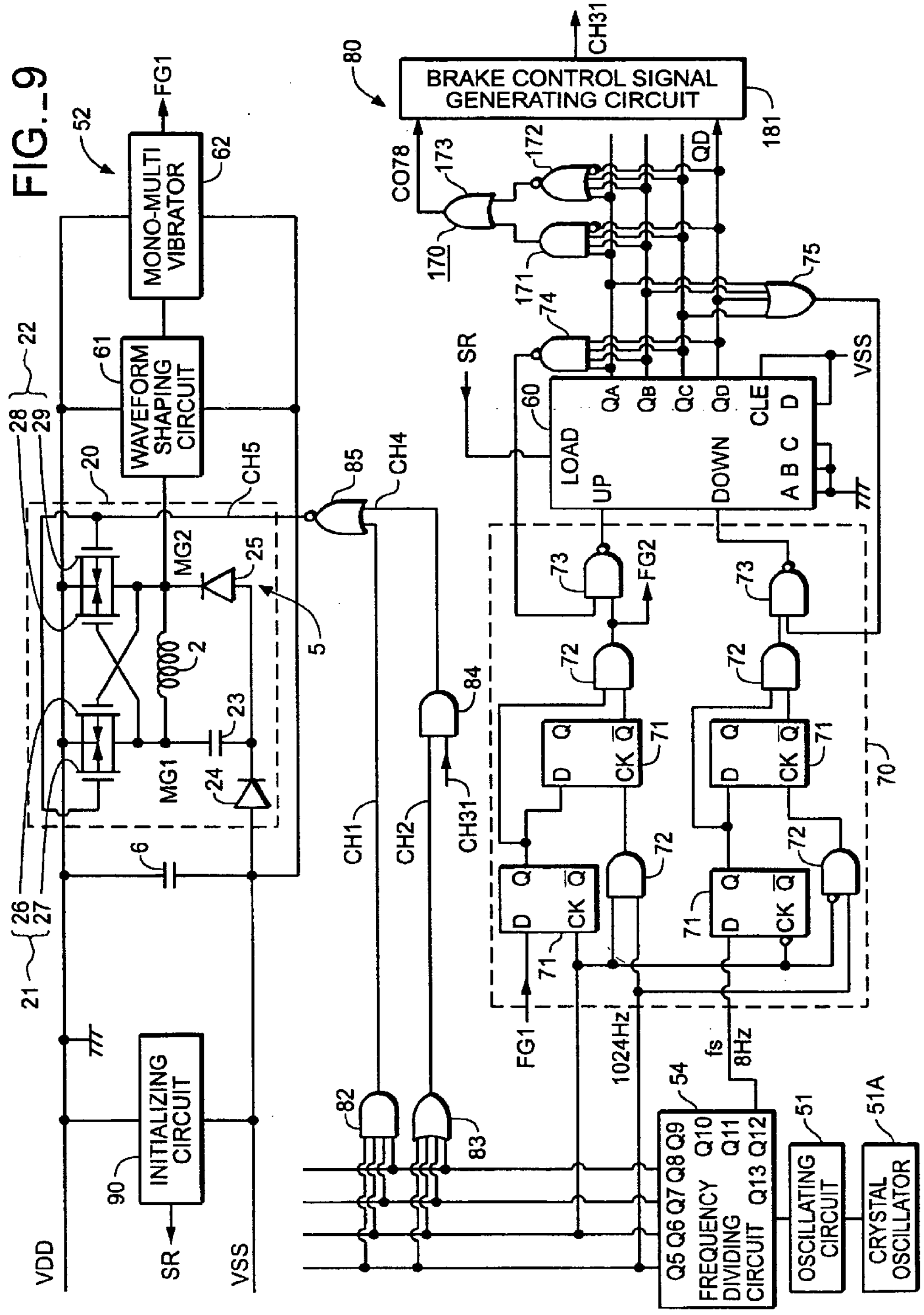
FIG. 9 is a circuit diagram showing the construction of an electronically controlled mechanical timepiece of a second embodiment.
Figure 10:
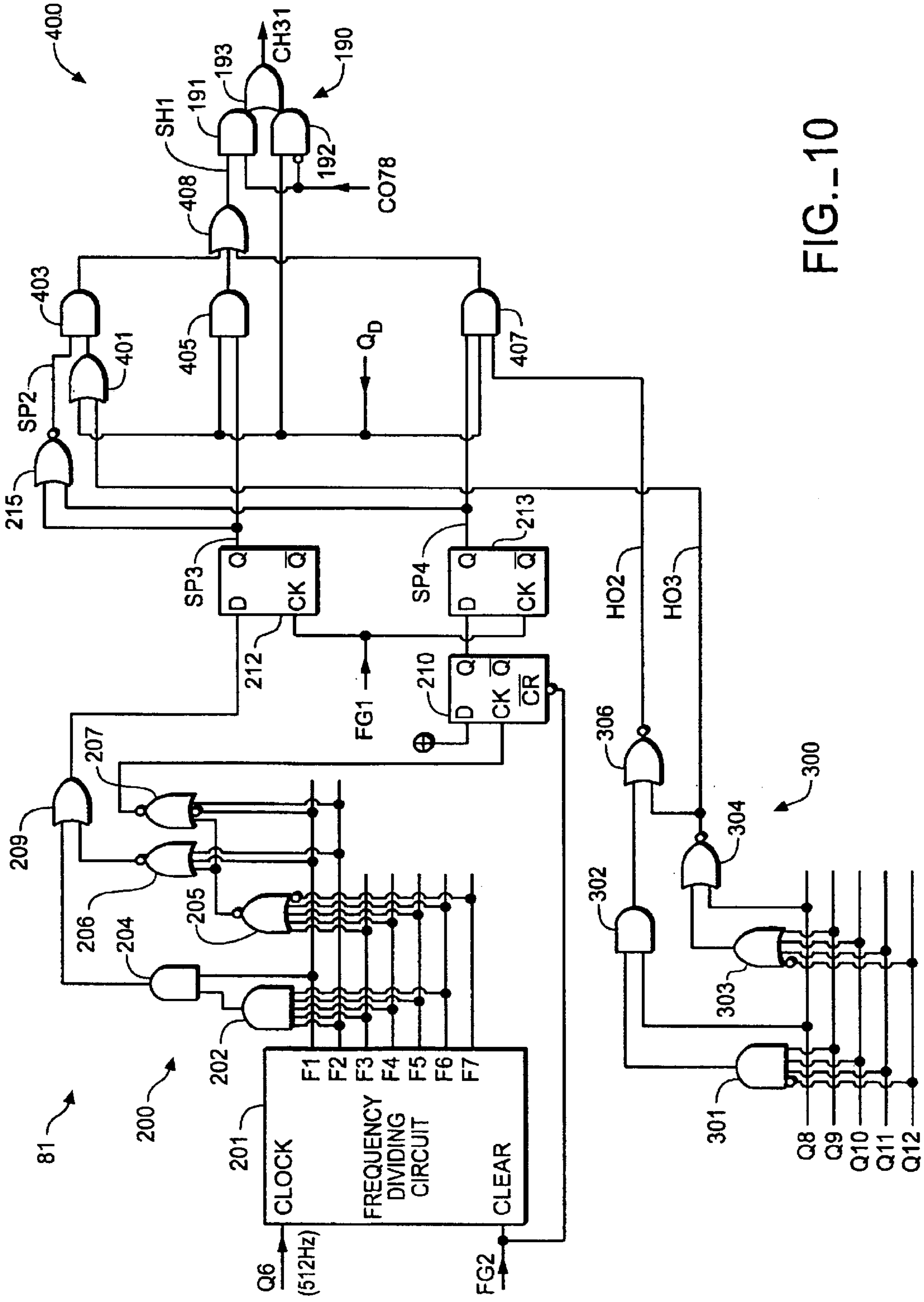
FIG. 10 is a circuit diagram showing the construction of a brake control signal generating circuit of the second embodiment.

A second embodiment according to the present invention will now be described with reference to FIG. 9 and FIG. 10. In this embodiment, the same or similar components as those in the first embodiment discussed above will be assigned the same reference numerals and the descriptions thereof will be omitted or simplified.

This embodiment shares the same construction as that of the foregoing first embodiment except that a counter value detecting circuit 170 that detects whether the counter value is a set value ("7" or "8") on the basis of outputs QA through QD of a count-up/down counter 60 has been newly added, and a brake control signal generating circuit 181 is constructed to make corrections based on three levels.

The counter value detecting circuit 170 is composed of an AND gate 171 and an OR gate 172 connected to the outputs QA through QD of the count-up/down counter 60, and an OR gate 173 to which the outputs of the gates 171 and 172 are connected. The counter value detecting circuit 170 is configured such that it issues H-level signals if the counter value of the count-up/down counter 60 is "7" (the QA, QB, and QC are H, while the QD is L) and if it is "8" (the QA, QB, and QC are L, while the QD is H).

The brake control signal generating circuit 181 detects the rotation cycle of a rotor at three levels (SP2 through SP4), and has two types (H02 and H03) of correction values. Hence, although a part of the logic circuit has been removed, the configurations of a rotation cycle detecting circuit 200, a brake amount correcting circuit 300, and a signal selecting circuit 400 are basically the same as those of the first embodiment. However, a correction restricting circuit 190 has been added to an output SH1 of the OR gate 408.

The correction restricting circuit 190 is formed of two AND gates 191 and 192, and an OR gate 193. The correction restricting circuit 190 is configured so that it receives an output C078 of the counter value detecting circuit 170 and an output SH1 of the signal selecting circuit 400, and uses the output SH1 that has been corrected on the basis of the rotation cycle of a rotor only if the output C078 is H-level, i.e., only if the counter value of the count-up/down counter 60 is "7" or "8", but directly issues the output QD as it is if the counter values are other than the above.

Accordingly, a brake control signal CH31 output from the brake control signal generating circuit 181 causes a brake correction to be made only if the count-up/down counter 60 indicates "7" or "8", and the output QD is supplied as it is in response to any other counter values. In making a correction, if the rotation cycle of the rotor is below 123 ms (if it is earlier than a reference signal cycle), then the SP2 will be an H-level signal, so that the output SH1 (the brake control signal CH31) will be a signal obtained by combining the output QD and the correction signal H03 at the OR gate 401, i.e., a signal in which a fall time, namely, the high braking time, is longer by the correction signal H03 than the fall time of the output QD.

Furthermore, if the rotation cycle of the rotor ranges from 123 to 127 ms (substantially identical to the reference signal cycle), then the SP3 is switched to an H-level signal; therefore, the output SH1 (the brake control signal CH31) will be a signal composed of a direct output of the output QD.

If the rotation cycle of the rotor is 127 ms or more (if it is later than the reference signal cycle), then the SP4 is switched to an H-level signal; therefore, the brake control signal CH3 will be a signal obtained by combining the output QD and the correction signal H02 at the AND gate 406, i.e., a signal in which a fall time, namely, the high braking time, is shorter by the correction signal H02 than the fall time of the output QD.

This embodiment described above is also able to provide the same advantages as those in (1) through (9) in the first embodiment. More specifically, if the counter value is "7" or "8", then the brake control can be performed by using the brake control signal CH31 that has been corrected on the basis of the rotation cycle of the rotor, so that an adjustment can be made to quickly bring the rotation cycle of the rotor close to the reference signal. With this arrangement, optimum brake control can be conducted on the basis of the rotation cycle of the generator 2 regardless of the reference cycle; hence, a secure, sufficient brake amount can be provided, and the responsiveness in speed control can be enhanced, as compared with the case where the brake-ON control and the brake-OFF control are always carried out in every cycle of the reference cycle. Thus, variations in the rotation cycle of the rotor of the generator 2 can be reduced, allowing the generator 2 to stably rotate at a substantially constant speed.

(10) Moreover, the counter value detecting circuit 170 and the correction restricting circuit 190 are provided to make corrections only if the counter value is "7" or "8", that is, only if the counter value is a set value for brake switching (within the predetermined range including the set value), and no corrections are made in any other cases. Hence, if the rotation cycle of the rotor significantly deviates from the reference cycle, it can be quickly brought back to the reference cycle. More specifically, adding the correction signals H01 through H04 to make brake corrections inevitably involves a changeover from the high brake to the low brake, and it is impossible to continue to apply the high brake or the low brake. For this reason, if the value of the count-up/down counter 60 is considerably away from the vicinity of a set value providing the threshold value of the brake control, then no brake corrections are made so as to allow continued application of the high brake or the low brake. This, therefore, permits quick elimination of a cumulative error in a case where the rotation cycle is considerably shifted from the reference cycle at, for example, the startup or the like of the generator 2.

(11) The brake control signal generating circuit 181 performs the three-level detection, so that the configuration is simpler than in the chopper signal generating section 80 of the first embodiment, and cost can be reduced.

The present invention is not limited to the embodiments. Modifications, improvements, etc. within a scope where the object of the present invention can be attained are included in the present invention.

For instance, the duty ratio of the chopper signals in the chopper signal generating section 80 is not limited to 1/16 or 15/16 as in the above embodiments; it may be other values, such as 14/16. Furthermore, the duty ratio of the chopper signals may be set to 28/32, 31/32, etc., and the changes of the duty ratio may be made in 32 steps rather than 16 steps. At this time, the chopper signals used for the high brake control preferably has a duty ratio of about 0.75 to about 0.97. Setting the duty ratio in a range from about 0.75 to about 0.89 allows the charging voltage to be further improved, and setting it in a higher range from 0.90 to 0.97 allows braking force to be further increased.

In the embodiments, the chopper signals used for the low brake control may have duty ratios set in a low range of about 1/16 to about 1/32. In short, the duty ratio and frequency of each chopper signal may be set as appropriate in actual operation. In this case, setting the frequency, for example, in a high range from 500 to 1100 Hz enables the charging voltage to be further improved. Conversely, setting the frequency in a low range from 25 to 50 Hz enables the braking force to be further enhanced. Thus, changing the duty ratios and the frequencies of the chopper signals makes it possible to further enhance the charging voltage and braking force.

When switching the chopper signals according to the counter values of the count-up/down counter 60, the switching is not limited to the one based on the three levels for the counter values below "8", "8", and "9" or more, respectively. Alternatively, the switching may be made on the basis of, for example, the counter values of below "8", "8 to 9", and "10 to 15", respectively. These values may be set as appropriate in actual operation.

As the brake control unit, the four-bit count-up/down counter 60 has been used; alternatively, however, a count-up/down counter of three bits or less may be used, or a count-up/down counter of five bits or more may be used. The use of a count-up/down counter of a larger number of bits permits counting of a larger number of values, so that the range in which cumulative errors can be stored can be expanded, making it advantageous for carrying out the control especially in a non-locked state immediately after the startup or the like of the generator 2. On the other hand, using a counter having a smaller number of bits provides a smaller range in which cumulative errors can be stored; however, especially when the locked state is set, counting up and down will be repeated, providing an advantage in that even a one-bit counter can handle the task, and the cost can be reduced accordingly.

The brake control unit is not limited to the count-up/down counter; it may be composed of first and second counting means provided for the reference signal fs and the rotation detection signal FG1, respectively, and a comparator circuit for comparing the count values of the counting means. Using the count-up/down counter 60, however, is advantageous in that the circuit configuration will be simpler.

Alternatively, the brake control unit may detect the power generating voltage, rotation cycle (speed) or the like of the generator 2, and conduct brake control based on the detected value. The specific configuration therefor may be set as appropriate in actual operation.

In the embodiments, the brake control is carried out by using the two types of chopper signals having different duty ratios or frequencies to implement the high brake control. However, three or more types of chopper signals having different duty ratios or frequencies may be used. Furthermore, the frequencies or duty ratios may be set so that they are continuously changed as in the case of frequency modulation rather than being changed in steps.

Figure 11:
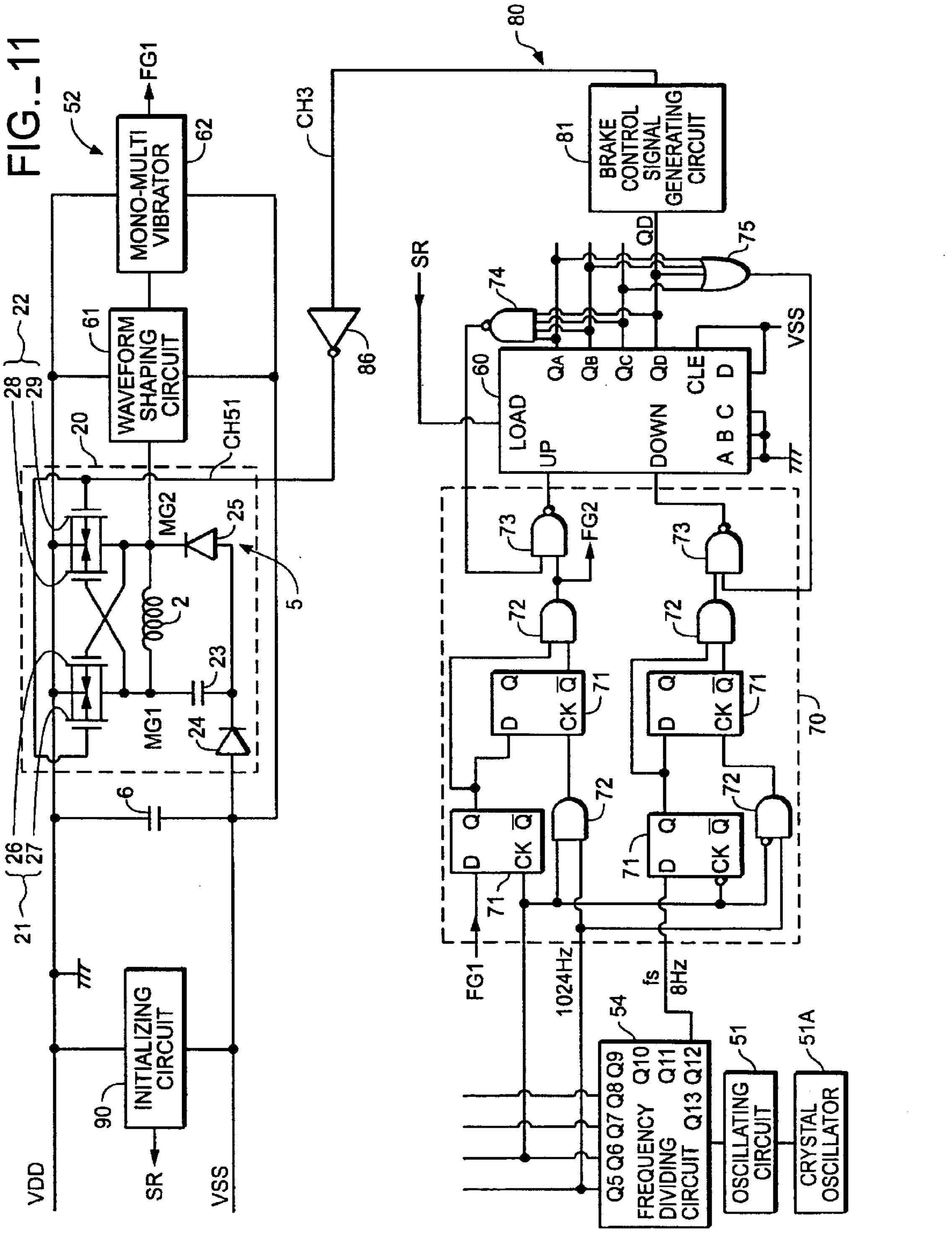
FIG. 11 is a circuit diagram showing the construction of a modification according to the present invention.

In the embodiments, the braking force of the rotor has been controlled using the chopper signals; alternatively, however, the brake control may be implemented without using the chopper signals. For instance, as shown in FIG. 11, the brake control signal CH3 from the brake control signal generating circuit 81 may be inverted through an inverter 86 into a brake signal CH51 thereby to implement brake control so that the brake is held applied when the brake control signal CH3 is at the H-level, while the brake is turned OFF when it is at the L-level. The same or like components as those shown in FIG. 2 will be assigned the same reference numerals, and the descriptions thereof will be omitted or simplified.

Figure 12:
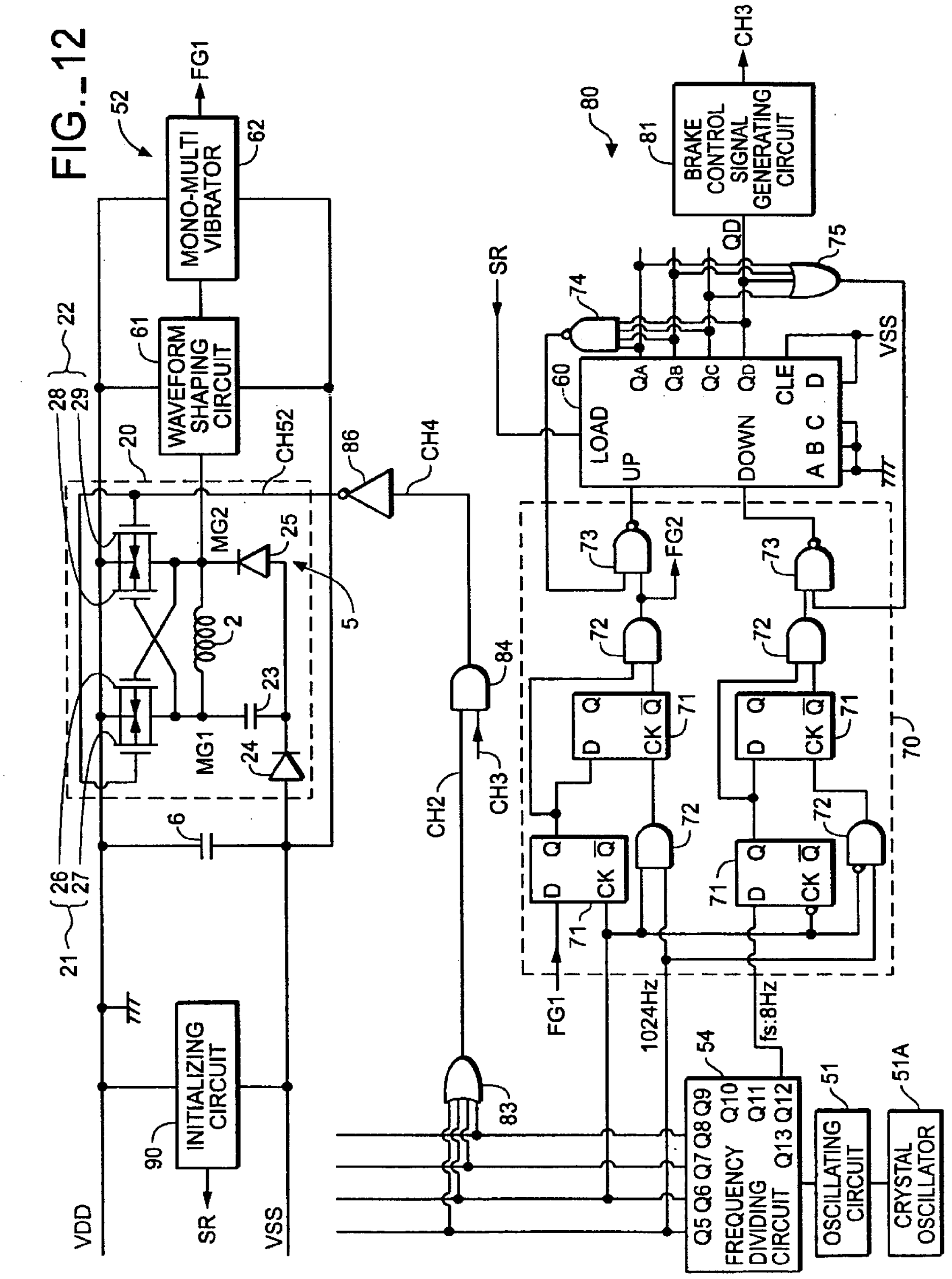
FIG. 12 is a circuit diagram showing the construction of another modification according to the present invention.

In the above embodiments, the two types of chopper signals have been used to conduct the high brake control and the low brake control. Alternatively, as shown in FIG. 12, the AND gate 82 may be removed, and the output CH4 may be inverted through the inverter 86 into a brake signal CH52 so as to control speed by carrying out the high brake control using chopper signals and the brake OFF control for completely turning the brake OFF. The same or like components as those shown in FIG. 2 will be assigned the same reference numerals, and the descriptions thereof will be omitted or simplified.

The correction values set at the brake amount correcting circuit 300 are not limited to the three-level or five-level values in the embodiments; they may be classified into any other levels as long as they are classified into one or more levels, and may be set as appropriate in actual operation. For example, in the embodiments, based on the reference cycle, other than the case where the rotation cycle is substantially identical to the reference cycle and no corrections are added, corrections have been made in the case where the rotation cycle is earlier than the reference cycle and the case where the rotation cycle is later than the reference cycle. Alternatively, however, the corrections may be made, for example, only in either the case where the rotation cycle is earlier than the reference cycle or the case where the rotation cycle is later than the reference cycle. At this time, a correction may be made in one level (two levels, including no corrections) or in two or more levels. However, making corrections in both the case where the rotation cycles are earlier and the case where it is later, as in the embodiments, provides an advantage of quicker speed control.

The correction values may be set so that they are continuously changed on the basis of the rotation cycle of the generator. In this case, more detailed adjustments can be made. However, setting the correction values beforehand as in the embodiments is advantageous in that the configuration of the brake amount correcting circuit 300 can be simplified.

The rotation cycles detected by the rotation cycle detecting circuit 200 may be set as appropriate according to the correction levels.

The specific correction amounts of the correction signals H01 through H04 set at the brake amount correcting circuit 300 and the range of the rotation cycle in which the correction signals H01 through H04 are used may be set as appropriate in actual operation.

The specific configurations of the rectifying circuit 5, the brake circuit 20, the control circuit 53, the chopper signal generating section 80, etc. are not limited to those in the embodiments; the specific configurations may be different therefrom, as long as they allow brake control of the generator 2 of the electronically controlled mechanical timepiece to be implemented by chopper control or the like. In particular, the configuration of the rectifying circuit 5 is not limited to the one in the embodiments that makes use of the chopper step-up. The rectifying circuit 5 may be constructed by, for example, providing a plurality of capacitors, and a step-up circuit or the like that increases voltage by switching the connection of the capacitors may be incorporated therein. Setting may be made as appropriate according to the type or the like of the electronically controlled mechanical timepiece in which the generator 2 and the rectifying circuit are incorporated.

The switches for forming the closed loop by both ends of the generator 2 are not limited to the switches 21 and 22 in the embodiments. For instance, a resistance element may be connected to a transistor, and when transistors are turned ON to form the closed loop by both ends of the generator 2 by chopper signals, the resistance element may be disposed in the path. In short, any type of switches may be used as long as they are capable of forming the closed loop by both ends of the generator 2.

The present invention is not limited to the application to the electronically controlled mechanical timepieces in the embodiments. The present invention can be also applied to a variety of timepieces, such as a clock to stand on a table, etc., other types of clocks, portable timepieces, portable sphygmomanometers, portable telephones, pagers, pedometers, electronic calculators, portable personal computers, electronic personal organizers, portable radios, music boxes, metronomes, electric razors, etc.

Figure 13:
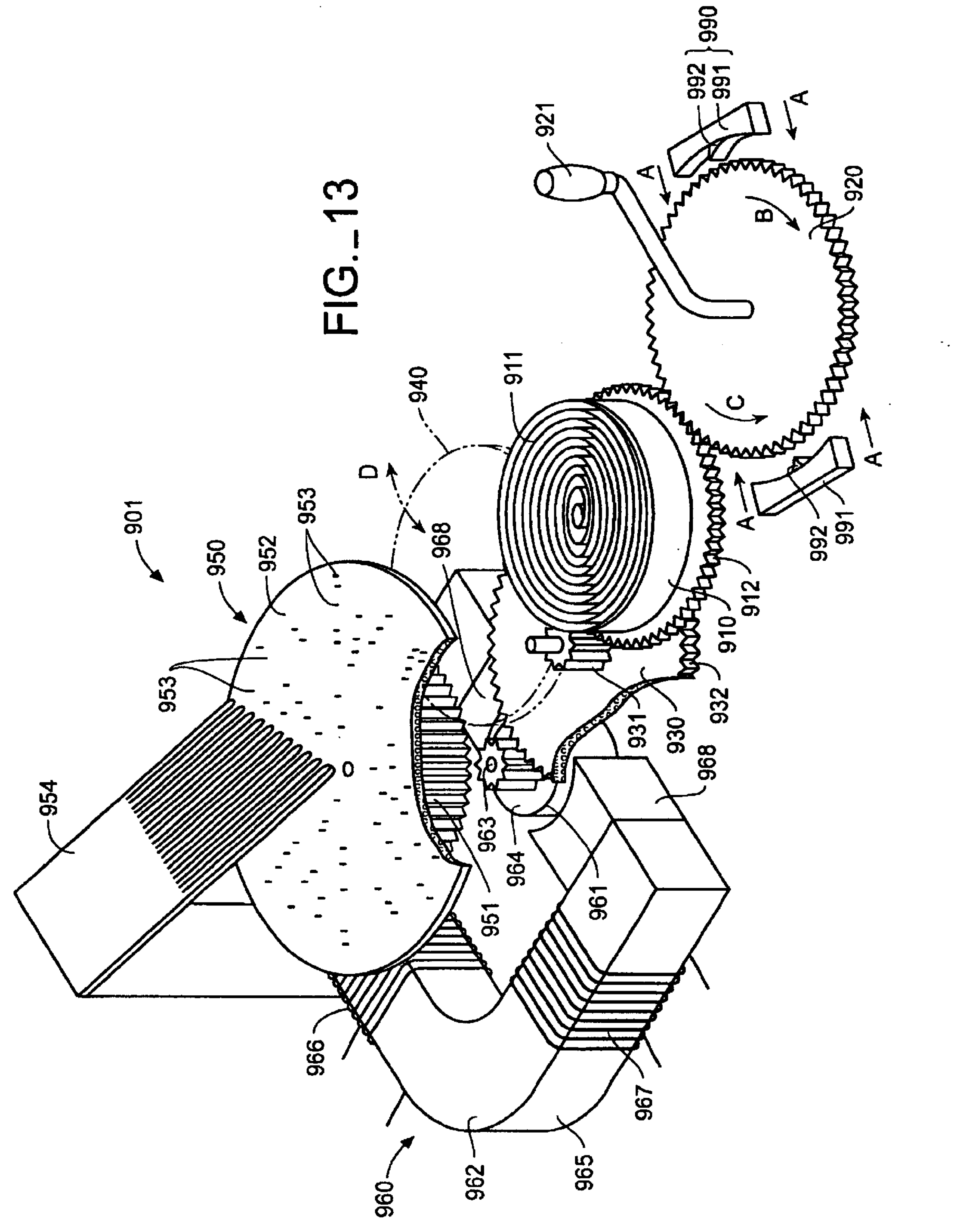
FIG. 13 is a perspective view showing the construction of an essential section of a music box that is a modification according to the present invention.

For example, the present invention may be applied to an acoustic device, such as a music box 901, as shown in FIG. 13.

Figure 14:
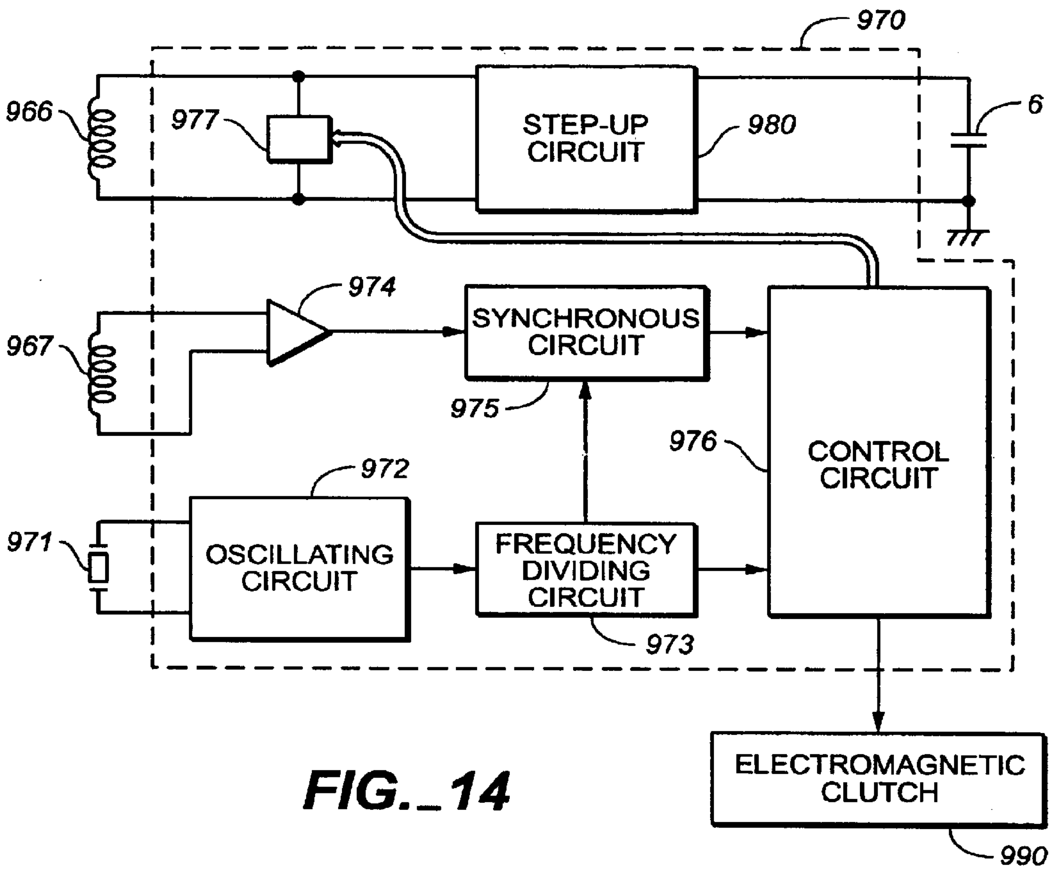
FIG. 14 is a circuit configuration diagram showing an essential section of a rotation control unit in the music box of FIG. 13.

The music box 901 is equipped with a movement barrel 910 housing a mainspring 911 acting as a mechanical energy source, a transmission wheel 920 that meshes with a barrel gear 912 of the movement barrel 910 to wind up the mainspring 911, an accelerating gear 930 that also meshes with the barrel gear 912 to transmit the mechanical energy of the mainspring 911, a decelerating gear 940 (indicated by a two-dot chain line) that meshes with a pinion 931 of the accelerating gear 930, a sound generating means 950 driven through the intermediary of the decelerating gear 940 to generate sound, a generator 960 that converts the mechanical energy transmitted by the accelerating gear 930 into electrical energy, and a rotation control unit 970 for controlling the rotational speed of the generator 960 at a constant level (FIG. 14). The music box 901 is employed as an electronic device in accordance with the present invention, and is used in a discrete form or by being built in a timepiece (clock) to play music for a predetermined time.

The transmission wheel 920 is provided with an electromagnetic clutch 990 acting as a locking mechanism having a pair of engagers 991. When the number of turns of the mainspring 911 decreases and the rotation of a rotor 961 markedly slows down, the electromagnetic clutch 990 moves the engagers 991 in the direction of arrows A to cause a ratchet member 992 to mesh with the transmission wheel 920 so as to stop its rotation (stop the rotation in the direction of arrow B), thereby preventing the mainspring 911 from unwinding any further.

The ratchet member 992 is urged toward the transmission wheel 920 by a spring or the like. Hence, even if the engagers 991 are in engagement with the transmission wheel 920, the transmission wheel 920 can be rotated only in the direction of arrow C by using a handle 921, allowing the mainspring 911 to be wound up.

The sound generating means 950 has substantially the same structure as that of a conventional music box, and is equipped with a rotating disc 952 provided on a pinion 951 in engagement with the decelerating gear 940. The sound generating means 950 plays music by playing a comb-like vibrating plate 954 by a plurality of pins 953 implanted in the upper surface of the rotating disc 952.

The generator 960 is equipped with a rotor 961 and a coil block 962.

The rotor 961 is constructed by a rotor pinion 963 in engagement with a gear 932 of the accelerating gear 930, and a rotor magnet 964 that integrally rotates with the rotor pinion 963.

The coil block 962 has a first coil 966 and a second coil 967 wound around a U-shaped stator 965, and the stator 965 is provided with a pair of core stator members 968 provided adjacently to the rotor 961. The stator 965 and the core stator members 968 have a structure wherein a plurality of sheet members are stacked to reduce eddy loss. The first coil 966 is used for power generation and braking, and the second coil 967 is exclusively used for detecting the rotation of the rotor 961.

The rotation control unit 970 is an electronic circuit composed of an IC constituted by an oscillating circuit 972 for driving a crystal oscillator 971, a frequency dividing circuit 973 for generating a reference signal of a constant frequency on the basis of a clock signal produced at the oscillating circuit 972, a comparator 974 acting as a rotation detecting means that is connected to the second coil 967, detects the rotational speed (a frequency based on an AC output waveform) of the rotor 961, and produces a detection signal based on the rotational speed, a synchronous circuit 975 for outputting the detection signal in synchronization with the reference signal, a control circuit 976 that compares the detection signal from the synchronous circuit 975 with the reference signal and outputs a brake control signal (chopper signal) based on the comparison result, and a brake circuit 977 that controls the speed of the rotor 961 of the generator 960 on the basis of the control signal from the control circuit 976, as shown in FIG. 14.

Of the above components, the brake circuit 977 is equipped with a switch composed of a transistor or the like that is capable of controlling the speed of the generator 960 by forming a closed loop by both ends of the coil 66, i.e., the generator 960. As in the embodiments, two types of chopper signals differing in at least duty ratio or frequency are selected and output from the control circuit 976 on the basis of the rotational speed of the rotor 961, and the brake circuit 977 controls the generator 960 by choppering based on the chopper signals.

With this arrangement, braking torque can be improved while maintaining a generated voltage at a constant value or more, so that the music box 901 with an extended lasting time can be accomplished. Furthermore, it is possible to cause the generator 960, i.e., the rotating disc 952, to rotate at a constant speed and to also continue its operation over an extended period of time, so that accurate musical performance can be continued for a long time.

To apply the present invention to a metronome, a metronome sound transmitting wheel is attached to a gear of a wheel train, and metronome tuning bars are played to generate periodical metronome sound by the rotation of the wheel. The metronome is required to produce sounds of diverse tempos. This requirement can be met by changing the cycle of a reference signal from the oscillating circuit by changing the frequency dividing stages of the crystal oscillator.

The mechanical energy source is not limited to a mainspring; it may be an elastic, a spring, a weight, etc. An appropriate mechanical energy source may be selected according to an object to which the present invention is applied.

Furthermore, as the energy transmitting device for transmitting the mechanical energy from a mechanical energy source, such as a mainspring, to a generator is not limited to the wheel train (gear) as in the embodiments; it may alternatively use a frictional wheel, a belt and a pulley, a chain and a sprocket wheel, a rack and a pinion, cam, etc., and it may be selected as appropriate according to the type or the like of an electronic device to which the present invention is applied.

The embodiments implemented to verify the advantages of the present invention will now be described.

Figure 15:
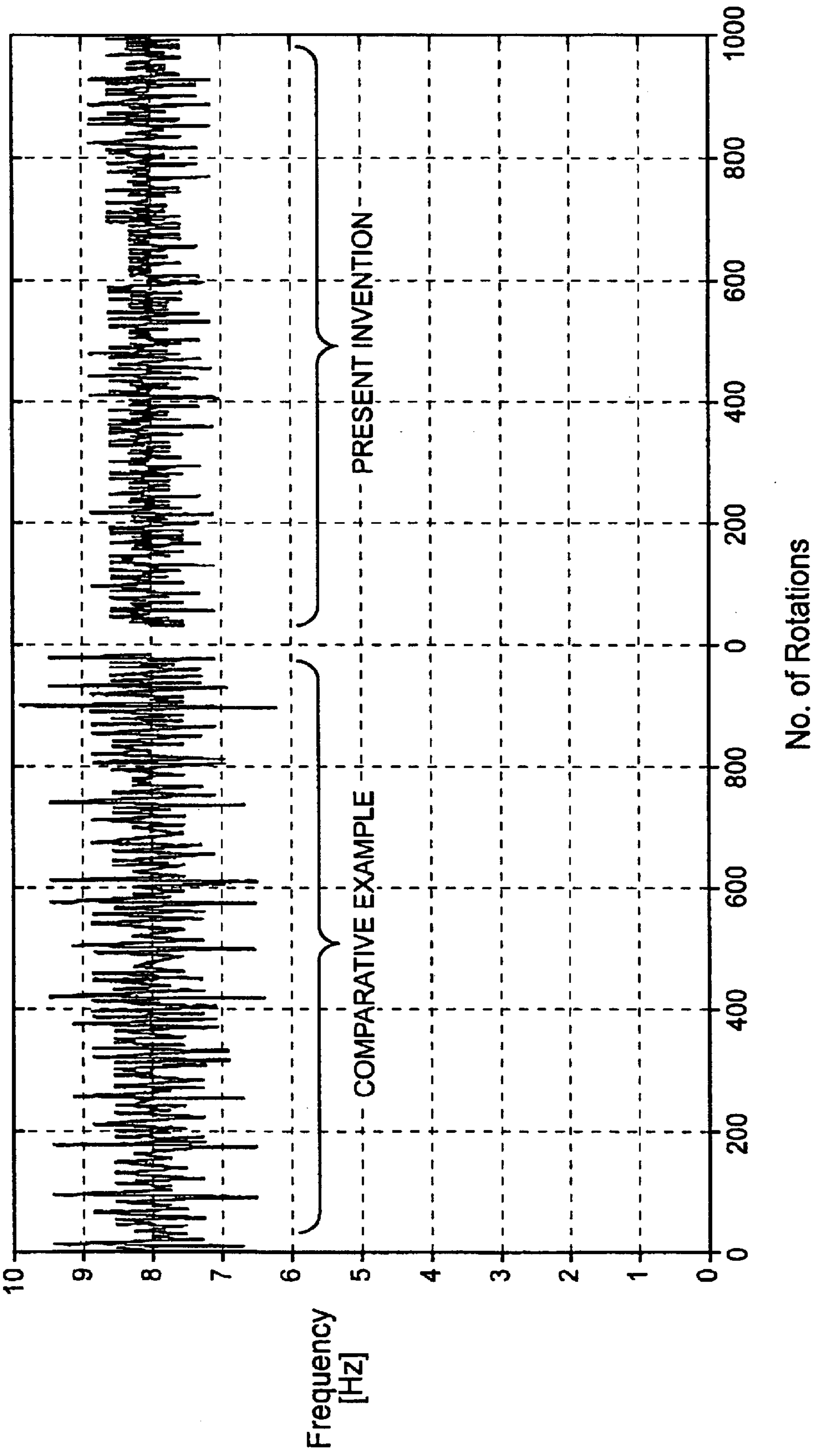
FIG. 15 is a graph showing the relationship between the rotational frequency and the number of rotations of a rotor in an embodiment according to the present invention.

The control according to the first embodiment has been compared with a comparative example wherein the output QD of the count-up/down counter 60 is directly used as it is for the brake control signal CH3 without employing the brake control signal generating circuit 81. As shown in FIG. 15, the embodiment demonstrates that the width of the fluctuation in the rotational frequency of the rotor is smaller regardless of the number of rotations of the rotor, and the variations in the rotation cycle of the rotor of the generator 2 could be reduced, allowing the generator 2 to stably rotate at a substantially constant speed. This has made it possible to verify the effectiveness of the present invention.

As described above, according to the electronically controlled electronic device, the electronically controlled mechanical timepiece, and the control method therefor in accordance with the present invention, a secure and sufficient brake amount can be provided, and the responsiveness of speed control can be enhanced, enabling stable control to be achieved.

What is claimed is:

1. An electronic device comprising a mechanical energy source, a generator that is driven by the mechanical energy source, generates induced electric power, and supplies electrical energy, and a rotation control unit that is driven by the electrical energy and controls a rotation cycle of the generator, wherein the rotation control unit comprises:

a brake control unit that compares a reference signal issued on the basis of a signal from a time standard source with a rotation detection signal based on the rotation cycle of the generator and sets a braking time of the generator, and a brake amount correcting unit that corrects the braking time set by the brake control unit on the basis of the rotation cycle of the generator.

2. An electronic device according to claim 1, wherein the brake amount correcting unit corrects the braking time by making the braking time shorter than the time set by the brake control unit if the rotation cycle of the generator is later than a predetermined range based on the cycle of the reference signal.

3. An electronic device according to claim 1, wherein the brake amount correcting unit corrects the braking time by making the braking time longer than the time set by the brake control unit if the rotation cycle of the generator is earlier than a predetermined range based on the cycle of the reference signal.

4. An electronic device according to claim 1, wherein the brake amount correcting unit corrects the braking time by making the braking time shorter than the time set by the brake control unit if the rotation cycle of the generator is later than a predetermined range based on the cycle of the reference signal, or by making the braking time longer than the time set by the brake control unit if the rotation cycle of the generator is earlier than a predetermined range.

5. An electronic device according to claim 1, wherein the brake control unit comprises a count-up/down counter that receives one of the rotation detection signal and the reference signal as a count-up signal, receives the other as a count-down signal, and is configured so that, if the value of the count-up/down counter is a set value or more, then a brake is applied to the generator, and if it is below the set value, then the brake applied to the generator is released.

6. An electronic device according to claim 5, wherein the brake amount correcting unit corrects the braking time only if the value of the count-up/down counter lies in a predetermined range that includes the set value.

7. An electronic device comprising a mechanical energy source, a generator that is driven by the mechanical energy source, generates induced electric power, and supplies electrical energy, and a rotation control unit that is driven by the electrical energy and controls a rotation cycle of the generator, wherein the rotation control unit comprises:

a brake control unit that compares a reference signal issued on the basis of a signal from a time standard source with a rotation detection signal based on the rotation cycle of the generator and sets a high braking time during which a high brake is applied to the generator; and a brake amount correcting unit for correcting the high braking time set by the brake control unit on the basis of the rotation cycle of the generator.

8. An electronic device according to claim 7, wherein the rotation control unit comprises a switch that forms a closed loop with both ends of the generator, and a chopper signal generating section that produces chopper signals of two or more types differing in at least duty ratio or frequency applied to the switch, and is configured to apply one type of a chopper signal to the switch in order to apply a high brake to the generator, and, in other cases, to apply another type of a chopper signal, which is capable of causing a low brake to be applied to the switch.

9. An electronic device according to claim 7, wherein the brake amount correcting unit corrects the high braking time by making the high braking time shorter than the time set by the brake control unit if the rotation cycle of the generator is later than a predetermined range based on the cycle of the reference signal.

10. An electronic device according to claim 7, wherein the brake amount correcting unit corrects the high braking time by making the high braking time longer than the time set by the brake control unit if the rotation cycle of the generator is earlier than a predetermined range based on the cycle of the reference signal.

11. An electronic device according to claim 7, wherein the brake amount correcting unit corrects the braking time by making the high braking time shorter than the time set by the brake control unit if the rotation cycle of the generator is later than a predetermined range based on the cycle of the reference signal, or by making the high braking time longer than the time set by the brake control unit if the rotation cycle of the generator is earlier than the predetermined range.

12. An electronic device according to claim 7, wherein the brake control unit comprises a count-up/down counter that receives one of the rotation detection signal and the reference signal as a count-up signal, and receives the other as a count-down signal, and is configured so that if the value of the count-up/down counter is a set value or more, then the high brake is applied to the generator, or if it is below the set value, then the low brake is applied to the generator.

13. An electronic device according to claim 12, wherein the brake amount correcting unit corrects the high braking time only if the value of the count-up/down counter lies in a predetermined range that includes the set value.

14. An electronic device according to claim 1, wherein the electronic device is a timing device.

15. An electronic device according to claim 1, wherein the electronic device is a music box or a metronome.

16. An electronically controlled mechanical timepiece comprising the electronic device according to claim 1, comprising hands that are rotated, together with driving of the generator, by the mechanical energy source of the electronic device and subjected to speed control by the rotation control unit.

17. A control method for an electronic device comprising a mechanical energy source, a generator that is driven by the mechanical energy source, generates induced electric power, and supplies electrical energy, and a rotation control unit that is driven by the electrical energy and controls a rotation cycle of the generator, comprising:

adjusting a braking time of the generator by comparing a reference signal issued on the basis of a signal from a time standard source with a rotation detection signal based on the rotation cycle of the generator, and correcting the braking time on the basis of the rotation cycle of the generator.

18. A control method for an electronic device comprising a mechanical energy source, a generator that is driven by the mechanical energy source, generates induced electric power, and supplies electrical energy, and a rotation control unit that is driven by the electrical energy and controls a rotation cycle of the generator, comprising adjusting a high braking time during which a high brake is applied to the generator by comparing a reference signal issued on the basis of a signal from a time standard source with a rotation detection signal based on the rotation cycle of the generator, and correcting the high braking time on the basis of the rotation cycle of the generator.

19. A control method for an electronic device according to claim 17, wherein the braking time is corrected by making the braking time shorter than the time set by comparing the reference signal and the rotation detection signal if the rotation cycle of the generator is later than a predetermined range based on the cycle of the reference signal, or by making the braking time longer than the time set by comparing the reference signal and the rotation detection signal if the rotation cycle of the generator is earlier than the predetermined range.

20. A control method for an electronically controlled mechanical timepiece comprising a mechanical energy source, a generator that is driven by the mechanical energy source coupled through the intermediary of an energy transmitting unit, and generates induced electric power to supply electrical energy, hands coupled to the energy transmitting unit, and a rotation control unit that is driven by the electrical energy to control the rotation cycle of the generator, comprising:

comparing a reference signal issued based on a signal from a time standard source with a rotation detection signal based on the rotation cycle of the generator to adjust a braking time of the generator, and correcting the braking time on the basis of the rotation cycle of the generator.

21. A control method for an electronically controlled mechanical timepiece comprising a mechanical energy source, a generator that is driven by the mechanical energy source coupled through the intermediary of an energy transmitting unit, and generates induced electric power to supply electrical energy, hands coupled to the energy transmitting unit, and a rotation control unit that is driven by the electrical energy to control the rotation cycle of the generator, comprising:

comparing a reference signal issued on the basis of a signal from a time standard source with a rotation detection signal based on the rotation cycle of the generator to adjust a high braking time for the generator, and correcting the high braking time on the basis of the rotation cycle of the generator.

22. A control method for an electronically controlled mechanical timepiece according to claim 20, wherein the braking time is corrected by making the braking time shorter than the time set by comparing the reference signal and the rotation detection signal if the rotation cycle of the generator is later than a predetermined range based on the cycle of the reference signal, or by making the braking time longer than the time set by comparing the reference signal and the rotation detection signal if the rotation cycle of the generator is earlier than the predetermined range.

* * * * *